US011812474B2

(12) United States Patent
Xue et al.

(10) Patent No.: US 11,812,474 B2
(45) Date of Patent: Nov. 7, 2023

(54) SUB-CHANNEL-BASED OCCUPANCY TIME SHARING FOR UNLICENSED SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/229,642

(22) Filed: Apr. 13, 2021

(65) Prior Publication Data

US 2021/0400732 A1    Dec. 23, 2021

Related U.S. Application Data

(60) Provisional application No. 63/040,890, filed on Jun. 18, 2020.

(51) Int. Cl.
*H04L 5/00* (2006.01)
*H04L 5/14* (2006.01)
(Continued)

(52) U.S. Cl.
CPC ....... *H04W 74/0833* (2013.01); *H04W 16/14* (2013.01); *H04W 72/20* (2023.01); *H04W 74/0808* (2013.01); *H04W 72/044* (2013.01)

(58) Field of Classification Search
CPC ............. H04W 74/0833; H04W 16/14; H04W 72/0406; H04W 74/0808; H04W 72/044
(Continued)

(56) References Cited

U.S. PATENT DOCUMENTS

2019/0239112 A1*    8/2019   Rao .................... H04W 4/70
2019/0254059 A1     8/2019   Gulati et al.
(Continued)

FOREIGN PATENT DOCUMENTS

| CN | 111093287 A | 5/2020 | |
| EP | 4044745 A1 * | 8/2022 | ........ H04W 72/0446 |
| WO | WO-2021212354 A1 * | 10/2021 | ........... H04L 5/0091 |

OTHER PUBLICATIONS

International Search Report and Written Opinion—PCT/US2021/032013—ISA/EPO—dated Sep. 22, 2021.

*Primary Examiner* — Kwang B Yao
*Assistant Examiner* — Xuan Lu
(74) *Attorney, Agent, or Firm* — QUALCOMM Incorporated

(57) ABSTRACT

Methods, systems, and devices for wireless communications are described. In some systems, user equipment (UEs) may communicate over sidelink channels in a shared (e.g., unlicensed) channel bandwidth. A UE may implement sub-channel-based occupancy time sharing for the unlicensed sidelink to improve resource usage. The UE may gain access to the shared channel bandwidth for an occupancy time and may transmit a sharing indicator indicating a portion of resources of the shared channel bandwidth for the occupancy time. The UE may transmit a time-division multiplexing sharing indicator to share a portion of slots of the occupancy time, a frequency-division multiplexing sharing indicator to share a portion of sub-channels of the shared channel bandwidth, or some combination thereof. A UE receiving the sharing indicator may identify the shared resources and may transmit in these shared resources (e.g., without performing a full contention process for an occupancy time).

30 Claims, 15 Drawing Sheets

(51) Int. Cl.
　　　*H04W 76/14*　　　(2018.01)
　　　*H04W 74/00*　　　(2009.01)
　　　*H04W 74/08*　　　(2009.01)
　　　*H04W 16/14*　　　(2009.01)
　　　*H04W 72/20*　　　(2023.01)
　　　*H04W 72/044*　　(2023.01)

(58) Field of Classification Search
　　　USPC ........................................................ 370/329
　　　See application file for complete search history.

(56)　　　　　　　References Cited

U.S. PATENT DOCUMENTS

| | | | |
|---|---|---|---|
| 2020/0029318 A1* | 1/2020 | Guo | H04W 72/042 |
| 2020/0092685 A1* | 3/2020 | Fehrenbach | H04W 4/46 |
| 2021/0105815 A1* | 4/2021 | Salem | H04W 72/042 |
| 2021/0120546 A1* | 4/2021 | Tang | H04W 74/0808 |
| 2021/0136732 A1* | 5/2021 | Fakoorian | H04L 5/0041 |
| 2021/0212096 A1* | 7/2021 | Hassan Hussein | H04W 24/08 |
| 2021/0368351 A1* | 11/2021 | Cui | H04W 16/14 |
| 2022/0046593 A1* | 2/2022 | Stanczak | H04L 5/003 |
| 2022/0078845 A1* | 3/2022 | Xu | H04L 5/0037 |
| 2022/0150968 A1* | 5/2022 | Fehrenbach | H04W 72/23 |
| 2022/0167407 A1* | 5/2022 | Oviedo | H04W 74/0808 |

\* cited by examiner

Pre-Filler 330

Post-Filler 335

TDM COT Sharing Information 340 under US 11,812,474 B2

SUB-CHANNEL-BASED OCCUPANCY TIME SHARING FOR UNLICENSED SIDELINK

CROSS REFERENCE

The present application for patent claims the benefit of U.S. Provisional Patent Application No. 63/040,890 by Xue et al., entitled "SUB-CHANNEL-BASED OCCUPANCY TIME SHARING FOR UNLICENSED SIDELINK," filed Jun. 18, 2020, assigned to the assignee hereof, and expressly incorporated by reference herein.

FIELD OF TECHNOLOGY

The following relates generally to wireless communications and more specifically to sub-channel-based occupancy time sharing for unlicensed sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may communicate with one another via sidelink channels. In one aspect, a UE may transmit sidelink control information (SCI) and sidelink data messages to one or more other UEs via one or more sidelink channels. In some cases, the UEs may utilize sidelink communications in a shared (e.g., unlicensed) channel bandwidth. A UE may perform a channel access procedure to gain access to the shared channel bandwidth for a channel occupancy time (COT) to perform transmissions on the sidelink channel. However, efficient resource utilization for sidelink communications in a shared channel bandwidth may present challenges.

SUMMARY

The present disclosure relates to methods, systems, devices, and apparatuses that support sub-channel-based occupancy time sharing for sidelink communications in shared (e.g., unlicensed) channels. Generally, the described techniques provide for channel occupancy time (COT) sharing by a user equipment (UE) for sidelink to support reliable and robust sidelink channel access. In some aspects, a UE may implement sub-channel-based COT sharing for the sidelink to improve resource usage. The UE may gain access to the shared channel bandwidth for a COT and may transmit a sharing indicator indicating a portion of resources of the shared channel bandwidth for sharing. In one aspect, the UE may transmit the sharing indicator in a specific sub-channel or set of resources to indicate sharing information to a receiving UE. In some aspects, the UE may transmit a time-division multiplexing (TDM) sharing indicator to share a portion of slots of the COT, a frequency-division multiplexing (FDM) sharing indicator to share a portion of sub-channels of the shared channel bandwidth, or some combination thereof. A UE receiving the sharing indicator may identify the shared resources and may transmit in these shared resources of the COT (e.g., without performing a full contention process for a COT). In some aspects, the UE providing the sharing opportunity and a UE receiving the sharing information may transmit sidelink data messages concurrently in the COT using FDM shared resources. Additionally or alternatively, the UE providing the sharing opportunity may refrain from transmitting during TDM shared resources (e.g., the UE may transmit sidelink data messages in the COT up to the TDM shared resources and may refrain from transmitting additional sidelink data messages in the COT during the TDM shared resources). In some aspects, the COT sharing procedure may support robustness against interference sources while efficiently utilizing the shared channel bandwidth resources.

A method for wireless communications is described. The method may include gaining access to a shared channel bandwidth for an occupancy time based on a channel access procedure, identifying a set of resources for transmission of a sharing indicator, transmitting, on a sub-channel of the shared channel bandwidth, a sidelink control message including the sharing indicator, the sharing indicator indicating TDM sharing for a portion of the occupancy time, FDM sharing for the portion of the occupancy time, or a combination thereof, and communicating during the occupancy time based on the sharing indicator.

An apparatus for wireless communications is described. The apparatus may include a processor, memory coupled with the processor, and instructions stored in the memory. The instructions may be executable by the processor to cause the apparatus to gain access to a shared channel bandwidth for an occupancy time based on a channel access procedure, identify a set of resources for transmission of a sharing indicator, transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof, and communicate during the occupancy time based on the sharing indicator.

Another apparatus for wireless communications is described. The apparatus may include means for gaining access to a shared channel bandwidth for an occupancy time based on a channel access procedure, identifying a set of resources for transmission of a sharing indicator, transmitting, on a sub-channel of the shared channel bandwidth, a sidelink control message including the sharing indicator, the sharing indicator indicating TDM sharing for a portion of the occupancy time, FDM sharing for the portion of the occupancy time, or a combination thereof, and communicating during the occupancy time based on the sharing indicator.

A non-transitory computer-readable medium storing code for wireless communications is described. The code may include instructions executable by a processor to gain access to a shared channel bandwidth for an occupancy time based on a channel access procedure, identify a set of resources for transmission of a sharing indicator, transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof, and communicate during the occupancy time based on the sharing indicator.

In some aspects of the method, apparatuses, and non-transitory computer-readable medium described herein, the sharing indicator may indicate at least FDM sharing of a first sub-channel of the shared channel bandwidth. In some aspects of the method, apparatuses, and non-transitory computer-readable medium described herein, the communicating may include operations, features, means, or instructions for transmitting a sidelink data message on a second sub-channel of the shared channel bandwidth concurrent to a sidelink transmission by a responding UE on the first sub-channel during the occupancy time.

In some aspects of the method, apparatuses, and non-transitory computer-readable medium described herein, the sharing indicator may indicate at least TDM sharing of a second slot of the occupancy time. In some aspects of the method, apparatuses, and non-transitory computer-readable medium described herein, the communicating may include operations, features, means, or instructions for transmitting a sidelink data message in a first slot of the occupancy time prior to the second slot of the occupancy time and refraining from transmitting during the second slot of the occupancy time.

Some aspects of the method, apparatuses, and non-transitory computer-readable medium described herein may further include operations, features, means, or instructions for transmitting a first occupancy signal based on the gaining access to the shared channel bandwidth and prior to the set of resources, and transmitting a second occupancy signal upon completion of the transmitting the sidelink control message and prior to the second slot.

In some aspects of the method, apparatuses, and non-transitory computer-readable medium described herein, the sidelink control message including the sharing indicator may be transmitted in a first slot of the occupancy time, and the sharing indicator may indicate a second slot of the occupancy time for sharing the portion of the occupancy time.

In some aspects of the method, apparatuses, and non-transitory computer-readable medium described herein, the sharing indicator further indicates a listen-before-talk (LBT) type for a responding UE to share the occupancy time, a channel access priority class (CAPC), an energy detection (ED) threshold, a distance threshold, a set of interlaced frequency resources, a device identifier, location information, or a combination thereof.

Some aspects of the method, apparatuses, and non-transitory computer-readable medium described herein may further include operations, features, means, or instructions for receiving, from a base station, a sharing indicator configuration message indicating the set of resources for transmission of the sharing indicator, where the set of resources may be identified and the sidelink control message may be transmitted based on the sharing indicator configuration message, and transmitting, to the base station, a report message confirming transmission of the sidelink control message including the sharing indicator in the set of resources.

Some aspects of the method, apparatuses, and non-transitory computer-readable medium described herein may further include operations, features, means, or instructions for receiving, from a base station, a sharing indicator configuration message indicating the set of resources for transmission of the sharing indicator, where the set of resources may be identified and the sidelink control message may be transmitted based on the sharing indicator configuration message, monitoring a sidelink feedback channel for a collision in the portion of the occupancy time, the set of resources, or both and transmitting, to the base station, a report message based on the monitoring.

In some aspects of the method, apparatuses, and non-transitory computer-readable medium described herein, the identifying the set of resources may include operations, features, means, or instructions for identifying the set of sets of resources based on a system information block (SIB) message, a dedicated radio resource control (RRC) message, a downlink control information (DCI) message, a pre-configuration, or a combination thereof, and selecting the set of resources from the set of sets of resources for transmission of the sharing indicator, where the sidelink control message including the sharing indicator may be transmitted in the selected set of resources.

In some aspects of the method, apparatuses, and non-transitory computer-readable medium described herein, the set of resources indicates an LBT type for a responding UE to share the occupancy time, a CAPC, an ED threshold, or a combination thereof.

Some aspects of the method, apparatuses, and non-transitory computer-readable medium described herein may further include operations, features, means, or instructions for determining an earliest check out time for the occupancy time based on a CAPC, an ED threshold, or a combination thereof for the occupancy time, where the portion of the occupancy time may be based on the earliest check out time for the occupancy time.

In some aspects of the method, apparatuses, and non-transitory computer-readable medium described herein, the channel access procedure may include an LBT procedure. Some aspects of the method, apparatuses, and non-transitory computer-readable medium described herein may further include operations, features, means, or instructions for performing the LBT procedure for the shared channel bandwidth, where the gaining access to the shared channel bandwidth for the occupancy time may be based on a success of the LBT procedure, and where the performing the LBT procedure may include operations, features, means, or instructions for monitoring an energy level of the shared channel bandwidth during a contention window that may be asynchronous to a frame timing associated with the communicating, where the gaining access to the shared channel bandwidth for the occupancy time may be based on the energy level being below an ED threshold for the contention window.

A method for wireless communications is described. The method may include receiving, from a UE on a sub-channel of a shared channel bandwidth, a sidelink control message including a sharing indicator in a set of resources, determining that the sharing indictor indicates TDM sharing for a portion of an occupancy time, FDM sharing for the portion of the occupancy time, or a combination thereof, gaining access to the shared channel bandwidth for the portion of the occupancy time based on the sharing indicator and a channel access procedure by the UE for sharing the occupancy time, and transmitting a sidelink data message in the portion of the occupancy time based on the gaining access to the shared channel bandwidth.

An apparatus for wireless communications is described. The apparatus may include a processor, memory coupled with the processor, and instructions stored in the memory. The instructions may be executable by the processor to cause the apparatus to receive, from a UE on a sub-channel of a shared channel bandwidth, a sidelink control message including a sharing indicator in a set of resources, determine that the sharing indictor indicates TDM sharing for a portion of an occupancy time, FDM sharing for the portion of the occupancy time, or a combination thereof, gain access to the shared channel bandwidth for the portion of the occupancy time based on the sharing indicator and a channel access procedure by the UE for sharing the occupancy time, and transmit a sidelink data message in the portion of the occupancy time based on the gaining access to the shared channel bandwidth.

Another apparatus for wireless communications is described. The apparatus may include means for receiving, from a UE on a sub-channel of a shared channel bandwidth, a sidelink control message including a sharing indicator in a set of resources, determining that the sharing indictor indicates TDM sharing for a portion of an occupancy time, FDM sharing for the portion of the occupancy time, or a combination thereof, gaining access to the shared channel bandwidth for the portion of the occupancy time based on the sharing indicator and a channel access procedure by the UE for sharing the occupancy time, and transmitting a sidelink data message in the portion of the occupancy time based on the gaining access to the shared channel bandwidth.

A non-transitory computer-readable medium storing code for wireless communications is described. The code may include instructions executable by a processor to receive, from a UE on a sub-channel of a shared channel bandwidth, a sidelink control message including a sharing indicator in a set of resources, determine that the sharing indictor indicates TDM sharing for a portion of an occupancy time, FDM sharing for the portion of the occupancy time, or a combination thereof, gain access to the shared channel bandwidth for the portion of the occupancy time based on the sharing indicator and a channel access procedure by the UE for sharing the occupancy time, and transmit a sidelink data message in the portion of the occupancy time based on the gaining access to the shared channel bandwidth.

In some aspects of the method, apparatuses, and non-transitory computer-readable medium described herein, the sharing indicator may indicate at least FDM sharing of a first sub-channel of the shared channel bandwidth. In some aspects of the method, apparatuses, and non-transitory computer-readable medium described herein, the transmitting may further include operations, features, means, or instructions for transmitting the sidelink data message on the first sub-channel of the shared channel bandwidth concurrent to a sidelink transmission by the UE on a second sub-channel of the shared channel bandwidth during the occupancy time.

In some aspects of the method, apparatuses, and non-transitory computer-readable medium described herein, the sharing indicator may indicate at least TDM sharing of a second slot of the occupancy time. In some aspects of the method, apparatuses, and non-transitory computer-readable medium described herein, the transmitting may further include operations, features, means, or instructions for refraining from transmitting during a first slot of the occupancy time prior to the second slot of the occupancy time and transmitting the sidelink data message in the second slot of the occupancy time.

In some aspects of the method, apparatuses, and non-transitory computer-readable medium described herein, the channel access procedure for sharing the occupancy time may include an LBT procedure. Some aspects of the method, apparatuses, and non-transitory computer-readable medium described herein may include operations, features, means, or instructions for performing the LBT procedure for the shared channel bandwidth based on the portion of the occupancy time, where the gaining access to the shared channel bandwidth for the portion of the occupancy time may be based on a success of the LBT procedure.

In some aspects of the method, apparatuses, and non-transitory computer-readable medium described herein, the LBT procedure includes a first LBT procedure corresponding to a first monitoring duration that is shorter than a second monitoring duration for a second LBT procedure associated with contending for the occupancy time.

Some aspects of the method, apparatuses, and non-transitory computer-readable medium described herein may further include operations, features, means, or instructions for entering a sleep mode based on receiving the sharing indicator in the first slot of the occupancy time and exiting the sleep mode prior to the second slot of the occupancy time.

DETAILED DESCRIPTION

Figure 1:
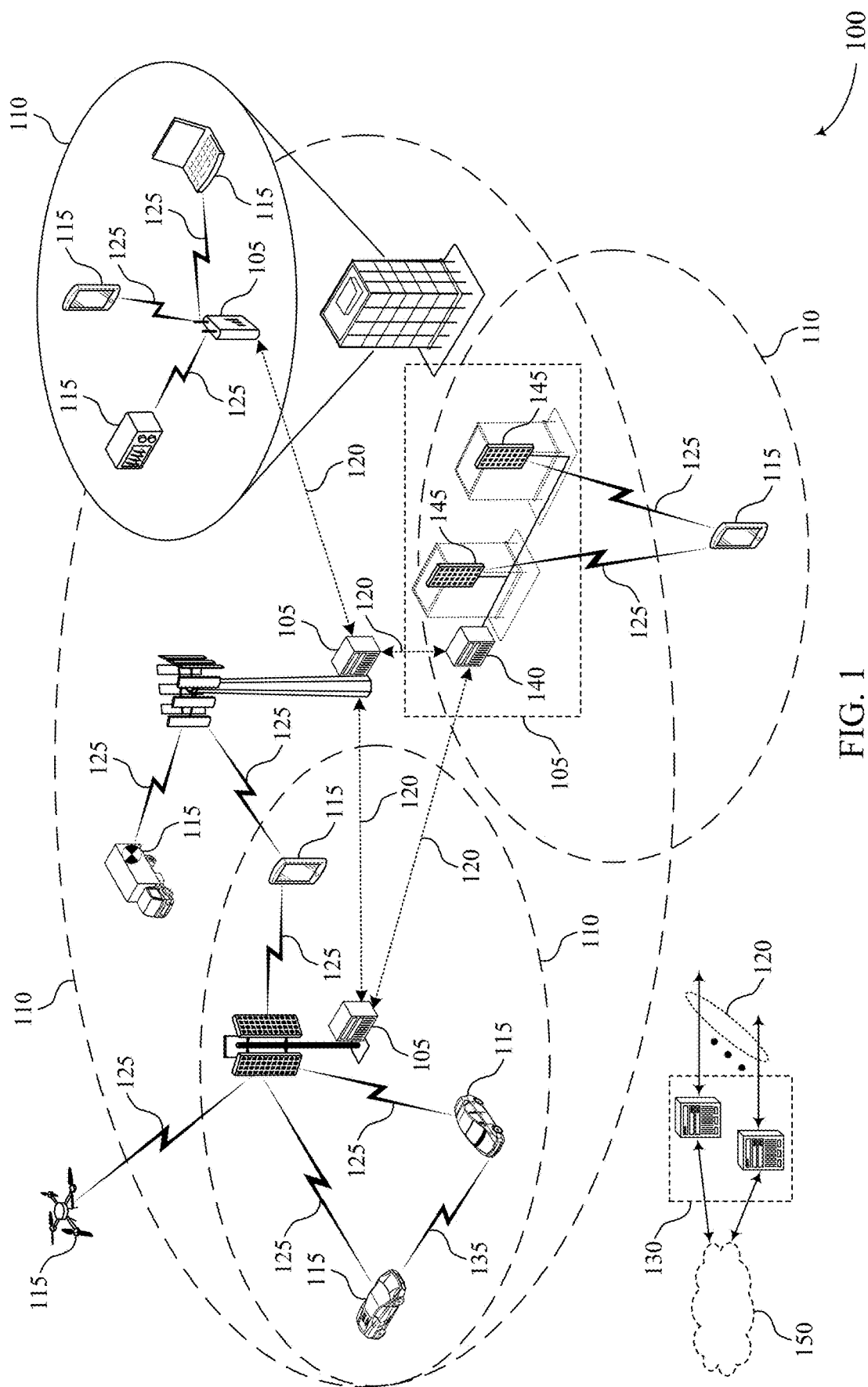
FIGS. 1 and 2 illustrate examples of wireless communications systems that support sub-channel-based occupancy time sharing for unlicensed sidelink in accordance with aspects of the present disclosure.

In some wireless communications systems, a user equipment (UE) may communicate with one or more additional UEs via sidelink communication channels. In one aspect, a UE may transmit sidelink control information (SCI) and sidelink data messages to one or more other UEs via a physical sidelink control channel (PSCCH), a physical sidelink shared channel (PSSCH), or a combination thereof. In some cases, the UEs may utilize sidelink communications in shared (e.g., unlicensed) channels. A UE may perform a channel access procedure to gain access to the shared channel bandwidth for a channel occupancy time (COT) to perform transmissions on a sidelink channel. However, allocating all of the shared channel bandwidth resources to the UE for the duration of the COT may result in inefficient resource usage for the shared channel bandwidth. Such a procedure may restrict sidelink channel access for other UEs, such as UEs failing to gain channel access to the channel due to interfering neighboring nodes.

To support reliable and robust sidelink channel access, UEs may implement sub-channel-based occupancy time sharing for a shared channel bandwidth. In one aspect, a UE may gain access to the shared channel bandwidth for a COT using a listen-before-talk (LBT) procedure. In some cases, the UE may determine to share a portion of the channel resources with other UEs for sidelink transmissions. The UE (e.g., referred to as a sharing provider UE) may transmit a sharing indicator indicating a portion of resources of the shared channel bandwidth for the COT. In one aspect, the UE may transmit a time-division multiplexing (TDM) sharing indicator to share a portion of slots of the COT, a frequency-division multiplexing (FDM) sharing indicator to share a portion of sub-channels of the shared channel bandwidth, or some combination thereof. A UE receiving the sharing indicator (e.g., referred to as a sharing receiver UE) may identify the shared resources, gain access to the shared resources (e.g., without performing a full contention process for a COT), and transmit sidelink data in the shared resources. Accordingly, the sharing receiver UE may reduce the latency involved in accessing the channel for sidelink transmissions, effectively mitigating the negative effects of potential interference sources.

In some aspects, the sharing provider UE may implement FDM sharing, TDM sharing, or a combination thereof. For FDM sharing, the sharing provider UE may share a portion of the shared channel bandwidth in a slot for one or more other UEs to transmit sidelink data. The sharing provider UE may concurrently transmit sidelink data in another portion of the shared channel bandwidth in the slot (e.g., a portion not shared by the sharing indicator). For TDM sharing, the sharing provider UE may share the full shared channel bandwidth in a slot for one or more other UEs to transmit sidelink data. The sharing provider UE may transmit sidelink data in slots of the COT preceding the TDM shared resources and may refrain from transmitting further sidelink data messages in the TDM shared slots. In some cases, the sharing provider UE may share a first portion of a COT using FDM sharing and may share a second portion of the COT using TDM sharing.

In some aspects, the sharing receiver UE may be configured to search for specific sharing indicators in specific monitoring windows. The sharing receiver UE may monitor for a sharing indicator in multiple sets of resources, where the sets of resources may be configured on a semi-static or dynamic basis. In some cases, each set of resources may implicitly indicate sharing information for the COT. Additionally or alternatively, the sharing indicator may include sharing information for the COT in one or more fields. The sharing information may indicate TDM sharing, FDM sharing, a set of shared resources (e.g., frequency resources, time resources, or both), an LBT type for channel access, a channel access priority class (CAPC), an energy detection (ED) threshold, or any combination of these or other relevant sharing information.

Aspects of the disclosure are initially described in the context of wireless communications systems. Additional aspects of the disclosure are described with reference to sub-channels and process flows. Aspects of the disclosure are further illustrated by and described with reference to apparatus diagrams, system diagrams, and flowcharts that relate to sub-channel-based occupancy time sharing for unlicensed sidelink.

FIG. 1 illustrates an example of a wireless communications system 100 that supports sub-channel-based occupancy time sharing for unlicensed sidelink in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. In one aspect, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. In one aspect, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. In one aspect, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In one aspect, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In some other aspects, the overlapping geographic coverage areas 110 associated with different technologies may be supported by different base stations 105. The wireless communications system 100 may include a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some aspects, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. In one aspect, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. In one aspect, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. In one aspect, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

In some cases, channels may be shared between multiple licensed operators, or channels may be licensed to one or more operators with opportunistic access by additional operators or devices. As used herein, shared channels refer to unlicensed channels or channels shared between one or more operators or with opportunistic access. Shared radio frequency channels may thus be acquired (e.g., via successful LBT procedures indicating the shared radio frequency channel is available) before transmission. LBT procedures may also be defined according to multiple categories. Examples of LBT categories include a category one LBT (Cat1 LBT), a category two LBT (Cat2 LBT), a category three LBT (Cat3 LBT), and a category four LBT (Cat4 LBT). A Cat1 LBT may include no LBT. A Cat2 LBT may include channel sensing but without a backoff time (e.g., a pseudo-random backoff, or the like) if the channel is busy. A Cat3 LBT may include channel sensing with a pseudo-random backoff if the channel is busy and a fixed size contention window. A Cat4 LBT may include channel sensing with a pseudo-random backoff if the channel is busy and a variable size contention window. In some cases, a Cat4 LBT may also be known as a Type 1 LBT, while Cat1 and Cat2 LBT may be known as variants of a Type 2 LBT. In one aspect, Type 2 LBT procedures may include a first LBT procedure (e.g., Type 2A) with a first sensing duration (e.g., 25 us), which may be used when a channel is reserved but occupancy not maintained until a start of the transmission, a second LBT procedure (e.g., Type 2B) with a second sensing duration (e.g., 16 us), which may be used when a channel is reserved and occupancy maintained with a gap that is less than the first sensing duration until a start of the transmission, and a third LBT procedure (e.g., Type 2C) having a suppressed sensing duration (e.g., no sensing prior to transmission), which may be used when occupancy is maintained to the start of the transmission (e.g., with a gap less than the second sensing duration).

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. In one aspect, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

To support robust sidelink channel access for the wireless communications system 100, the wireless communications system 100 may implement sub-channel-based occupancy time sharing for unlicensed sidelink. In one aspect, a UE 115 may gain access to the shared channel bandwidth for a COT using an LBT procedure. In some cases, the UE 115 may determine to share a portion of the channel resources with other UEs 115 for sidelink transmissions (e.g., on D2D communication links 135). In some aspects, these UEs 115 may be examples of vehicles communicating in a V2X system. The sharing provider UE 115 may transmit a sharing indicator indicating a portion of resources of the shared channel bandwidth for the COT. In one aspect, the sharing provider UE 115 may transmit a TDM sharing indicator to share a portion of time resources of the COT, an FDM sharing indicator to share a portion of frequency resources of the shared channel bandwidth, or some combination thereof. A sharing receiver UE 115 may receive the sharing indicator, identify that the sharing indicator is a valid COT sharing indicator for the sharing receiver UE 115 (e.g., based on one or more parameters for sharing), gain access to the shared resources using a channel access procedure, and transmit sidelink data in the shared resources (e.g., in the COT occupied by the sharing provider UE 115).

Specifically, the UEs 115 may utilize a configured set of sub-bands for communicating COT sharing indicators. The sets of sub-bands may be pre-configured, semi-statically configured, or dynamically configured for a transmit resource pool over an unlicensed band. A sharing receiver UE 115 may receive a COT sharing indicator for a COT (e.g., by monitoring the configured set of sub-bands) and may use an indicated LBT variant (e.g., a Type 2 LBT variant) to access one or more sidelink sub-channels during the COT. In some aspects, the sharing receiver UE 115 may access granted resources of the sidelink sub-channels. In some other aspects, the sharing receiver UE 115 may select resources of the sidelink sub-channel to access. The UE 115 may access the one or more sub-channels for a specific time duration (e.g., a specific number of symbols or slots) shared by the COT sharing indicator. Using the accessed resources, the UE 115 may transmit one or more sidelink data messages in the COT based on the COT sharing procedure.

Accordingly, the sharing receiver UE 115 may reduce the latency involved in accessing the sidelink channel and may improve the resource usage of the sidelink channel (e.g., as compared to if the UE 115 waited to transmit on the sidelink channel until it gained access to occupy its own COT). Furthermore, COT sharing may provide robustness against other interference sources, such as Wi-Fi nodes, and may support some low-complexity UEs 115 gaining access to unlicensed sidelink channel resources without performing Type 1 LBT.

Figure 2:
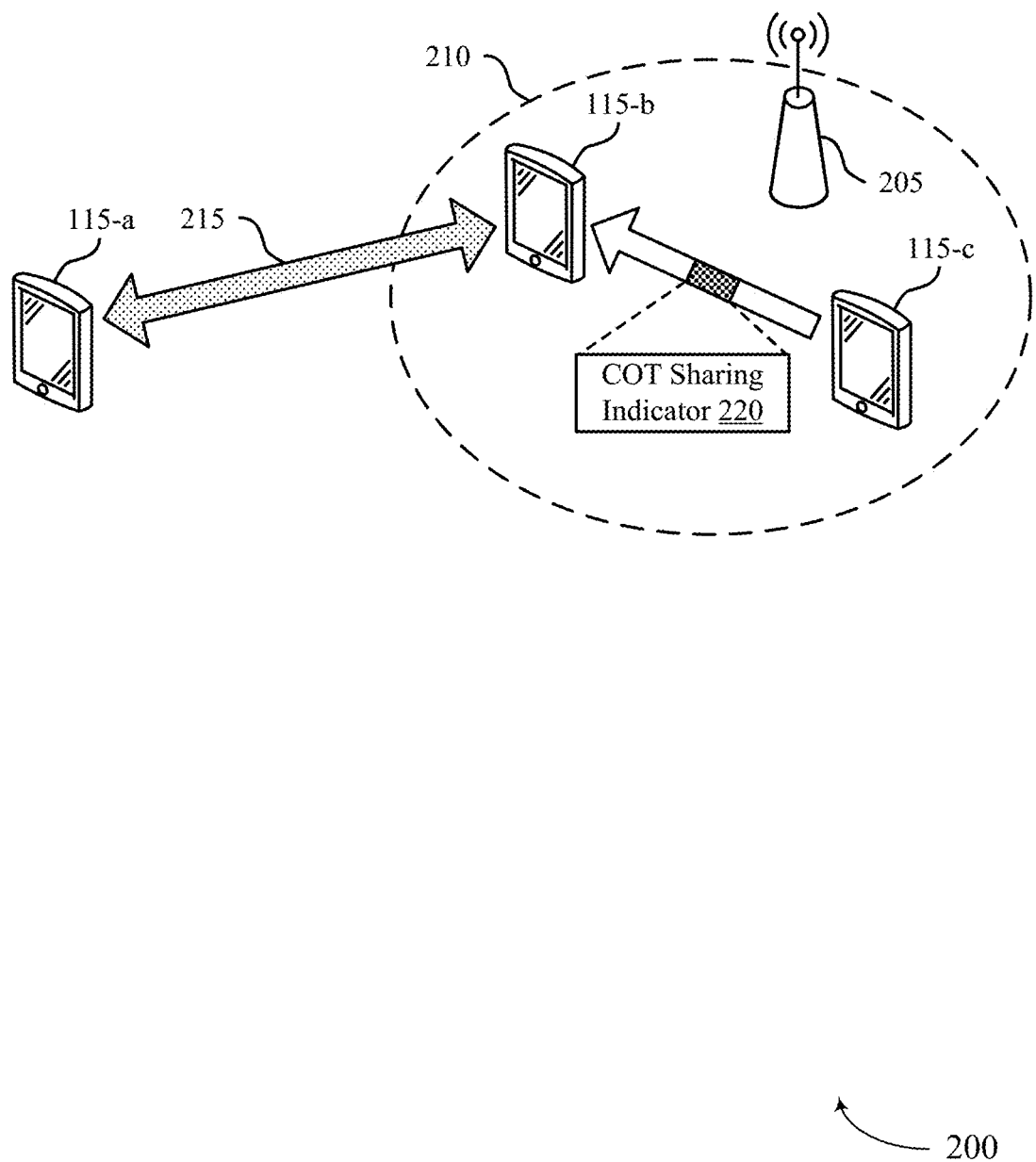

FIG. 2 illustrates an example of a wireless communications system 200 that supports sub-channel-based occupancy time sharing for unlicensed sidelink. The wireless communications system 200 may include UEs 115-a, 115-b, and 115-c which may be examples of UEs 115 as described with reference to FIG. 1. UEs 115-a, 115-b, and 115-c may support sidelink communications. Wireless communications system 200 may also include one or more nodes 205 (e.g., a Wi-Fi node). A node 205 may be an example of a base station 105 as described with reference to FIG. 1. Additionally or alternatively, a node 205 may be an example of another wireless device in wireless communications system 200. In some aspects, a node 205 may act as a "hidden node" to one or more UEs 115. In one aspect, the node 205 may be a hidden node to UE 115-a for communications with UE 115-b, because UE 115-a may be unable to detect signals from the node 205 (e.g., UE 115-a may be out of the coverage area 210 of the node 205) that may interfere with communications with UE 115-b. In some cases, a UE 115 (such as UE 115-c) may be configured to share COT sharing information with other UEs 115 (such as UEs 115-a and 115-b) via a COT sharing indicator 220. Such COT sharing techniques may mitigate the negative effects of a hidden node in the wireless communications system 200.

In some wireless communication systems 200 (e.g., NR systems), two or more devices (e.g., UEs 115-a, 115-b, and 115-c) may communicate with each other using sidelink signals 215. UEs 115 may implement sidelink communications to support public safety communications, proximity services, UE-to-network relaying of information, V2V or V2X communications, Internet of Everything (IoE) communications, IoT communications, Mesh applications, or any combination of these or various other suitable applications. Sidelink signals 215 may be transmitted from one subordinate entity to another subordinate entity (e.g., one UE 115 to another) without relaying the communications via a scheduling entity (e.g., a base station 105, as described with reference to FIG. 1). In some cases, the scheduling entity may provide scheduling information for sidelink signals 215 communicated between dependent entities. In some aspects, sidelink signals 215 may be communicated using an intelligent transportation systems (ITS) band or licensed band. In the wireless communications system 200, UE 115-a, UE 115-b, and/or UE 115-c may communicate using sidelink signals via a shared (e.g., unlicensed) band. In some aspects, the wireless communications system 200 may support enhanced mobile broadband (eMBB) and URLLC in unlicensed sidelink (e.g., in the 5 gigahertz (GHz) unlicensed band, in the 6 GHz unlicensed band, or in any other unlicensed frequency band).

A UE 115 may use one or more modes of radio resource allocation (RRA) to identify resources for transmitting sidelink signals 215. A first mode (e.g., Mode 1) may involve network-controlled RRA. In some aspects, a UE 115 may receive a grant from a network entity (e.g., a base station 105) for sidelink channel access. In some cases, the grant may be received in downlink control information (DCI) (e.g., a DCI 3-0 format or another DCI format). A second mode of RRA (e.g., Mode 2) may involve autonomous RRA by a UE 115. In some aspects, a UE 115 may choose and/or reserve sidelink channel access by monitoring (e.g., sensing) the channel. If the channel is clear for a specific time duration during the sensing, the UE 115 may gain access to the channel. A sidelink channel may include a PSCCH, a PSSCH, or a combination thereof. A PSCCH may carry SCI. The SCI may include a stage-one SCI (SCI 1), a stage-two SCI (SCI 2), or both. A PSSCH may carry sidelink data and/or SCI 2 (e.g., SCI 2 may be multiplexed with sidelink data). SCI may be front-loaded in a slot (e.g., transmitted in a first half or a first set of symbols of the slot). Additionally or alternatively, a sidelink channel may include a physical sidelink feedback channel (PSFCH).

In some aspects, a device in wireless communications system 200 (e.g., UEs 115-a, 115-b, 115-c or a node 205) may reserve an occupancy time for unlicensed channel access based on completing a successful LBT procedure. The device may check out a COT for channel access in order to transmit data, share the channel resources with another device, or both. A UE 115 may perform an LBT procedure and may receive a check out time for occupying the unlicensed sidelink channel. The UE 115 may be configured with a check out time according to a CAPC used during the LBT procedure, an ED threshold used during the LBT procedure, or both. In one aspect, a lower CAPC (e.g., including more deferral slots) may correspond to an earlier allowed check out time. Similarly, a lower ED threshold (e.g., indicating that the channel is relatively clear of interference for a larger area) may correspond to an earlier allowed check out time. In some aspects, different UEs 115 may be configured with different check out times (e.g., based on the CAPC, the ED threshold, or a combination thereof). As such, different UEs 115 may be configured to transmit COT sharing indicators 220 in a same sub-channel with different priorities via different Type 1 LBT check out times. In one aspect, UE 115-c may announce COT sharing indicator 220 prior to when UE 115-a may announce another COT sharing indicator 220 in the same sub-channel. An earlier allowed check out time may support additional sharing opportunities for the channel.

A UE 115 gaining access to the shared channel bandwidth for a COT may transmit sidelink transmissions 215 over the channel. Additionally or alternatively, as described herein, the UE 115 may act as a COT sharing provider for the COT and may provide one or more COT sharing indicators 220 to one or more other UEs 115. In one aspect, UE 115-c may access a COT and may share resources of the COT with UE 115-b using a COT sharing indicator 220. UE 115-b may use the COT sharing indicator 220 received from UE 115-c to gain access to the shared channel bandwidth for a portion of the COT and may transmit sidelink signals 215 in the shared resources. In some cases, a UE 115 may be configured for COT sharing by a centralized scheduler (e.g., according to a grant received from a base station 105 that includes COT sharing information). In an aspect, the UE 115 may receive a dedicated radio resource control (RRC) message (e.g., a Type 1 configured grant (CG) or a similar configuration message), a dedicated RRC message and a DCI message for activation (e.g., a Type 2 CG or a similar configuration message), a DCI message for a one-shot COT sharing indicator 220, or a combination thereof from a base station 105 to configure the UE 115 for COT sharing (e.g., configuring the UE 115 with a COT sharing indicator 220, a window for transmitting the COT sharing indicator 220, or both). In some aspects, the UE 115 may report back to the base station 105 whether the UE 115 successfully transmits the COT sharing indicator 220 in the specified window, such as in physical uplink control channel (PUCCH) resources configured by an RRC or DCI message. In some aspects, the UE 115 may indicate in layer 2 (L2) or layer 3 (L3) signaling whether collision occurs on a shared channel bandwidth (e.g., by monitoring PSFCHs for feedback messages confirming successful communication of sidelink data over the shared channel bandwidth). Additionally or alternatively, the UE 115 may determine to share COT resources autonomously (e.g., the UE 115 may gain access to the COT and share the COT resources with other UEs 115 autonomously).

A COT sharing receiver UE 115 may monitor for a COT sharing indicator 220 to improve the likelihood of the COT sharing receiver UE 115 gaining access to shared channel resources. In some aspects, the windows used to search for COT sharing indicators 220, the COT sharing indicators 220 themselves, or both may be semi-statically configured. A COT sharing provider UE 115 may transmit a COT sharing indicator 220 in a respective set of resources (e.g., a monitoring window). The COT sharing receiver UE 115 may monitor for a COT sharing indicator 220 in the sets of resources (e.g., the configured monitoring windows). In some aspects, a base station 105 may configure the UEs 115 with the windows using a system information block (SIB) X (e.g., SIB 1, SIB 2, etc.), a dedicated RRC configuration, a DCI message, or some other configuration signaling (e.g., when the UEs 115 operate according to RRA Mode 1). In some other aspects, the UEs 115 may be pre-configured with the windows (e.g., when operating according to RRA Mode 2). Additionally or alternatively, the windows may be dynamically determined. In one aspect, a UE 115 in a network-controlled RRA mode (e.g., mode 1) may receive a COT sharing indicator 220 and a respective window for transmitting the COT sharing indicator 220 via DCI.

Each UE 115 attempting to access the shared sidelink channel may be configured to check for COT sharing indicators 220. In one aspect, UE 115-b may be configured to search for one or more COT sharing indicators 220 in the one or more windows (e.g., sets of time resources, frequency resources, beamforming resources, or a combination thereof). In some cases, the windows may be pre-defined or configured (e.g., as described herein). A COT sharing indicator 220 received in a window may indicate a type of LBT procedure for UE 115-b to use to gain access to the shared resources of the COT (e.g., Type 1 LBT, Type 2 LBT, no LBT, etc.). Type 1 LBT may correspond to a "full" LBT procedure and may involve a longer contention window for monitoring the channel than Type 2 LBT. In some aspects, a COT sharing indicator 220 may indicate that UE 115-b may refrain from sensing the channel prior to accessing the channel (e.g., by using Type 2C LBT to access shared resources for less than a threshold time duration, such as 584 microseconds (µs)). In one aspect, refraining from sensing the channel prior to accessing the channel may accommodate one slot where a subcarrier spacing (SCS) is at least equal to a threshold value (e.g., 30 kilohertz (kHz)).

In some aspects, the COT sharing indicator 220 may specify which UEs 115 may share the indicated resources based on a distance threshold, a type of interlace, or both. In one aspect, the COT sharing indicator 220 may share a COT with UEs 115 located in a location within a distance threshold from a location of the COT sharing provider UE 115 (e.g., a COT sharing receiver UE 115 may be within a same coverage area 210 as the COT sharing provider UE 115, within a same zone identifier (ID) as the COT sharing provider UE 115, or within a threshold radio frequency (RF) distance from the COT sharing provider UE 115). Additionally or alternatively, the COT sharing indicator 220 may share the COT with UEs 115 that use a specific set of sub-channel interlaces (e.g., a COT sharing receiver UE 115 may use a set of interlaces that mitigate interference with sub-carriers used by the COT sharing provider UE 115).

Additionally or alternatively, the COT sharing indicator 220 may include timing information corresponding to the type of LBT procedure. In some aspects, a COT sharing indicator 220 may indicate a cyclic prefix (CP) extension, a CAPC, or a slot, resource, or sub-channel in which a UE 115 may conduct the indicated LBT procedure (e.g., one-shot LBT). Additionally or alternatively, the COT sharing indicator 220 may indicate an ED threshold. The COT sharing indicator 220 may be in the form of control information and may be protected by a cyclic redundancy check (CRC). In some cases, each COT sharing indicator 220 may have a unique identifier (ID). In some aspects, one or more of these parameters for COT sharing may be explicitly indicated as contents of the COT sharing indicator 220 (e.g., received in a dynamic monitoring window). Additionally or alternatively, one or more of these parameters may be implicitly indicated based on the window (e.g., set of resources) in which the COT sharing indicator 220 is transmitted and received (e.g., in a fixed or semi-static monitoring window). As such, a COT sharing receiver UE 115 (e.g., UE 115-*b*) receiving the COT sharing indicator 220 in a set of resources may determine the sharing information for the COT based on the COT sharing indicator 220, the set of resources, or a combination thereof and may determine how to gain access to the shared COT resources.

A COT sharing provider UE 115 (e.g., UE 115-*a*) may support contention window management. A successful LBT procedure (e.g., to gain access to a COT, to gain access to shared COT resources, etc.) may involve a UE 115 sensing the channel for a contention window. If the channel is free (e.g., the energy level detected by the UE 115 on the channel is below an ED threshold) for the duration of the contention window, the UE 115 may transmit on the shared channel (e.g., in some cases using an occupancy signal to occupy the channel prior to a sidelink transmission). A UE 115 may manage one or more contention windows (e.g., for contending for a COT, for allowing COT sharing receiver UEs 115 to contend for shared resources of a COT, or both). In some aspects, a length of a contention window may be fixed. In one aspect, a UE 115 may receive an indication of the contention window configured by a SIB X (e.g., SIB 1, SIB 2, etc.), an RRC message, a DCI message, or some other configuration signaling. In another aspect, the UE 115 may be pre-configured with the contention window. In some cases, the UE 115 may implement a fixed contention window for a transmission pool of resources that do not support corresponding feedback messages on a PSFCH.

In some aspects, the COT sharing provider UE 115 may configure a length of a contention window based on a channel busy ratio (CBR) for the sidelink channel. In one aspect, the UE 115 may measure a CBR and may implement a corresponding contention window based on the measured CBR. In some cases, the UE 115 may be configured with a range of contention windows and a lookup table (e.g., from SIB X, a pre-configuration, an RRC configuration, etc.) which the UE 115 may use to map a measured CBR to a corresponding contention window length. Additionally or alternatively, a contention window may be modified according to a PSFCH (e.g., for a transmission pool of resources that support corresponding feedback messages on a PSFCH). In one aspect, a COT sharing provider UE 115 may monitor one or more PSFCHs corresponding to one or more potential COT sharing receiver UEs 115 to update a contention window. The COT sharing provider UE 115 may receive feedback messages from one or more UEs 115 on the PSFCHs and may determine message collisions in a portion of the COT and/or a portion of time-frequency resources based on receiving negative acknowledgment (NACK) feedback. The COT sharing provider may modify a duration of a corresponding contention window according to information in the one or more PSFCHs, a collision rate, a mode of COT sharing (e.g., FDM COT sharing or TDM COT sharing), or some combination thereof.

In one aspect, a COT sharing provider UE 115 may operate in a half-duplex mode. Accordingly, the COT sharing provider UE 115 may implement TDM COT sharing to support receiving sidelink data messages from COT sharing receiver UEs 115 (e.g., because a half-duplex UE 115 may not support receiving sidelink messages concurrent to transmitting sidelink messages in an FDM sharing scheme). In one aspect, the COT sharing provider UE 115 may implement a TDM COT sharing indicator to receive feedback messages on one or more PSFCHs in the TDM shared resources. Additionally or alternatively, the half-duplex UE 115 may refrain from implementing FDM COT sharing or may implement TDM COT sharing along with FDM COT sharing to ensure support for receiving messages in the shared resources. The COT sharing provider UE 115 may configure a half-duplex COT sharing indicator 220 based on the capabilities of the COT sharing provider UE 115.

Some sidelink communications may be synchronous (e.g., may follow the same frame or slot timing). In some aspects, UEs 115 may perform LBT procedures on sidelink channels that may be defined in periodic instants (e.g., using fixed starting point LBT). Specifically, a UE 115 operating according to fixed starting point LBT may attempting to gain access to a channel at or slightly before a slot boundary for the unlicensed sidelink channel. In other aspects, some sidelink LBT procedures may be performed asynchronously (e.g., using floating point LBT procedures). Some nodes 205 (e.g., a Wi-Fi node 205) may conduct floating point LBT procedures, which may result in the frequent disruption of UEs 115 using fixed starting point LBT procedures to access a channel. That is, the node 205 performing floating point LBT procedures may have significantly more opportunities to gain access to the channel than a UE 115 performing fixed starting point LBT, such that UEs 115 performing fixed starting point LBT may be starved of shared channel access by the node 205. In some aspects, one or more UEs 115 may perform floating point LBT to gain access to a channel at any point within a slot (e.g., not limited to the slot boundary). Additionally or alternatively, a UE 115 may operate as a COT sharing provider UE 115 (e.g., UE 115-*c*) to help other UEs 115 gain access to unlicensed sidelink resources.

By providing a COT sharing indicator 220, a UE 115 may mitigate the effects of interference from other nodes 205 which may use floating point LBT procedures. With reference to FIG. 2, UEs 115-*b* and 115-*c* may be in coverage area 210 of a node 205. When UE 115-*a* communicates with UE 115-*b*, the sidelink signals 215 may experience interference from the node 205 (e.g., a hidden node for UE 115-*a*) transmitting in the vicinity of UE 115-*b*. In some aspects, UE 115-*c* may gain access to a COT and may share COT sharing indicator 220 with UE 115-*b*, which may provide for more reliable transmission of sidelink data 215 from UE 115-*a* to UE 115-*b* (e.g., may reduce the likelihood of interference from the hidden node 205). In some aspects, UE 115-*b* may identify UE 115-*c* as a COT sharing source for UE 115-*b* based on a unique COT sharing ID associated with UE 115-*c*, location information for UE 115-*b* and UE 115-*c*, or some combination thereof. UE 115-*b* may share the COT sharing ID associated with COT sharing provider UE 115-*c* to UE 115-*a*. UE 115-*a* may use the COT sharing ID to determine that UE 115-*c* provides shelter for UE 115-*b* from hidden nodes. In some aspects, UE 115-*a* may detect the COT sharing indicator 220 from UE 115-*c* and may determine to use the shared resources (e.g., FDM shared resources for the COT) for a sidelink transmission 215 to UE 115-*b*. In some other aspects, UE 115-*a* may determine COT sharing (e.g., FDM COT sharing) from UE 115-*c* based on a configuration (e.g., a SIB X configuration, a pre-configuration, etc.). By sharing resources of the COT occupied by UE 115-*c*, UE 115-*a* may transmit the sidelink data 215 to UE 115-*b* more reliably (e.g., by reducing potential interference from the node 205). In one aspect, the node 205 may not be hidden from UE 115-*c* and may refrain from transmitting on the shared channel when UE 115-*c* has gained access and occupies the shared channel.

UEs 115 may share COT resources with other UEs 115 using TDM techniques, FDM techniques, or a combination of the two. As described herein, UEs 115 configured as COT sharing providers may provide robustness over interference sources and provide signaling shelter to reduce interference from hidden nodes 205 (e.g., a Wi-Fi node) by providing COT sharing information via a COT sharing indicator 220 to other UEs 115. The COT sharing information may indicate available COT resources and a type of LBT to gain channel access.

Figure 3:
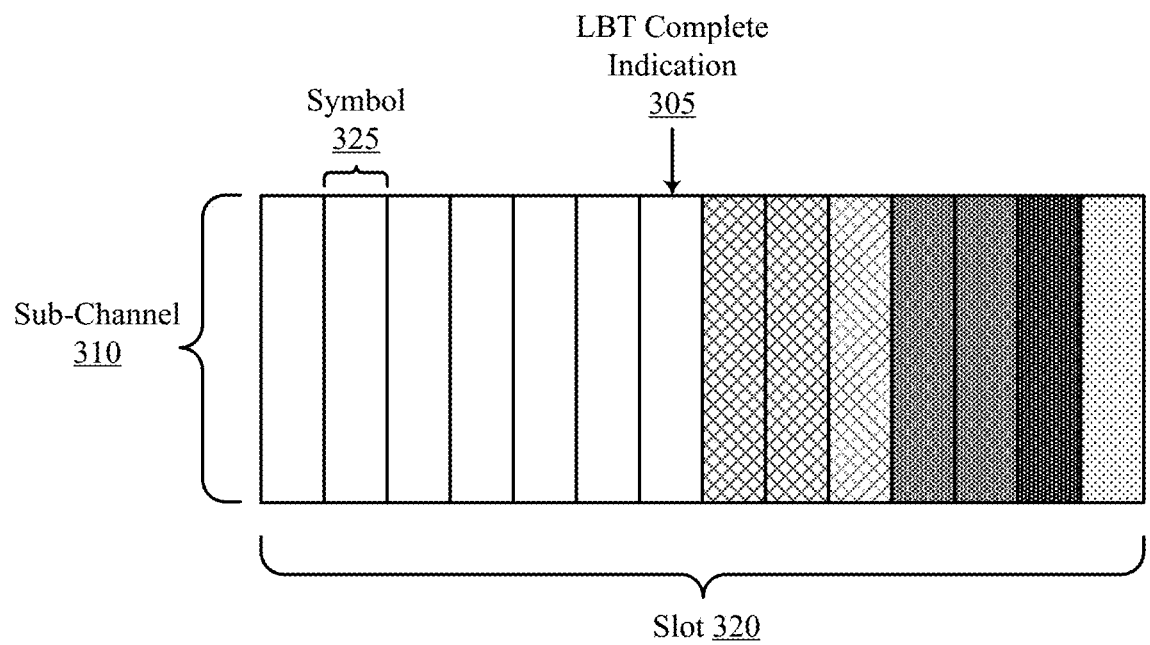
FIGS. 3 through 5 illustrate examples of sub-channels that support sub-channel-based occupancy time sharing for unlicensed sidelink in accordance with aspects of the present disclosure.
Figure 3:
Figure 3:
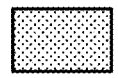
Figure 3:
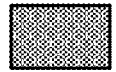

FIG. 3 illustrates an example of a sub-channel 310 that supports sub-channel-based occupancy time sharing for unlicensed sidelink in accordance with aspects of the present disclosure. In an aspect, the sub-channel 310 may support TDM-based COT sharing. The sub-channel 310 may be an interlaced (e.g., in frequency) sub-channel and may include one or more slots 320. A slot 320 may include a number of symbols 325, such as OFDM or DFT-S-OFDM symbols. In some aspects, a wireless device may monitor the sub-channel 310 for a number of symbols to perform an LBT procedure. As described herein, a UE 115—such as a UE 115 described with reference to FIGS. 1 and 2—may perform an LBT procedure to gain access to a shared channel bandwidth, including the sub-channel 310, for a COT.

In some aspects, a UE 115 may determine an LBT complete indication 305 in a symbol upon successful completion of an LBT procedure (e.g., an LBT complete indication 305 may be determined in symbol 6 of a slot 320 based on sensing the channel for one or more of symbols 0 through 5). Upon successfully contending for the sub-channel 310 based on the LBT complete indication 305, the UE 115 may transmit signals over the sub-channel 310. In some cases, the UE 115 may transmit TDM COT sharing information 340 following the LBT complete indication 305. In some aspects, the TDM COT sharing information 340 may be transmitted in symbols following a pre-filler 330. The pre-filler 330 may be an example of an occupancy signal transmitted such that the UE 115 may occupy the sub-channel 310 upon successfully completing LBT. In one aspect, the pre-filler 330 may include a partial repetition of control information including TDM COT sharing information 340. Additionally or alternatively, TDM COT sharing information 340 may be followed by a post-filler 335. The post-filler 335 may be an example of an occupancy signal and may reduce contamination of the COT (e.g., between non-shared resources and shared resources, between slots 320, etc.).

In some cases, interference may occur in the COT. Interference may be mitigated by including the optional post-filler 335, pre-filler 330, or both. The post-filler 335 may be transmitted in the sub-channel 310 after the TDM COT sharing information 340 and the pre-filler 330 may be transmitted in one or more symbols before the TDM COT sharing information 340 (e.g., based on when the UE 115 gains access to the sub-channel 310). The pre-filler 330 may provide an opportunity for UEs 115 attempting to gain channel access by receiving the TDM COT sharing information 340 to boost their signal to interference plus noise ratio (SINR) by implementing opportunistic chase combining between the pre-filler 330 and the TDM COT sharing information 340. In one aspect, a chase combination may combine TDM COT sharing information 340 with partially repeated TDM COT sharing information 340 in the pre-filler 330. Such a chase combination may improve the reliability of decoding the TDM COT sharing information 340.

The sub-channel 310 may be used for sidelink communications by a UE 115, as described with reference to FIGS. 1 and 2. In some cases, a UE 115 may occupy a 20 megahertz (MHz) bandwidth for sidelink transmissions based on an occupancy channel bandwidth (OCB) threshold, a power spectral density (PSD) threshold, or a combination thereof. A UE 115 configured as a COT sharing provider may provide TDM COT sharing information 340 to other UEs 115 via sub-channel 310. TDM COT sharing information 340 may be transmitted via sub-channel 310 in the form of control information. The TDM COT sharing information 340 may provide an indication of COT availability for channel access. In some aspects, a COT sharing provider may transmit TDM COT sharing information 340 to indicate that the remaining resources (e.g., subsequent symbols 325, slots 320, etc.) of the COT are available for sharing. In some other aspects, the TDM COT sharing information 340 may indicate specific time resources for sharing (e.g., by indicating a slot index, a symbol index, a slot counter, or a combination thereof). UEs 115 operating as COT sharing receivers may use the COT sharing indicator received via TDM COT sharing information 340 to access a portion of the available COT (e.g., for transmitting sidelink data, further sharing of the COT, etc.).

The TDM COT sharing information 340 may be transmitted in symbols relatively near the end of the slot 320 to provide room for LBT procedures in the slot 320. In one aspect, the TDM COT sharing information 340 may be transmitted in symbols 10, 11, and 12 in the slot 320. In some aspects, the TDM COT sharing information 340 may be transmitted at a fixed location in the slot 320 (e.g., back-loaded at a hard-code fixed location). The TDM COT sharing information 340 may use symbols 325 located after a receipt of an LBT complete indication 305.

As described herein, a UE 115 may gain access to a COT and may indicate subsequent resources (e.g., a symbol period, a slot 320, or some other time period) available for COT sharing by other UEs 115 via TDM COT sharing information 340. In some aspects, indicating a symbol 325 or slot 320 as an available TDM resource may allow a UE 115, which may be attempting to gain channel access, to use the available symbol 325 or slot 320 for sidelink communications. The indicated symbol 325 or slot 320 may subsequently be unavailable for sidelink transmissions by the COT sharing provider. In some aspects, the UE 115 may use the COT for one or more sidelink transmissions (e.g., based on information queued in a buffer for the UE 115) before sharing the remaining resources (e.g., across all sub-channels of the occupied shared channel bandwidth) with other UEs 115 via TDM COT sharing information 340. The COT sharing provider may halt transmissions (e.g., refrain from transmitting) in TDM shared resources of the COT. Additionally or alternatively, the UE 115 may transmit TDM COT sharing information 340 and may indicate a time (e.g., a symbol 325 or slot 320) at which the UE 115 may stop sharing the available COT with other UEs 115 (e.g., a UE 115 may share symbols 0-5 of a slot 320, may cede sharing resources of the available COT at symbol 5, and may use symbols 6-13 for sidelink transmissions).

Figure 4:
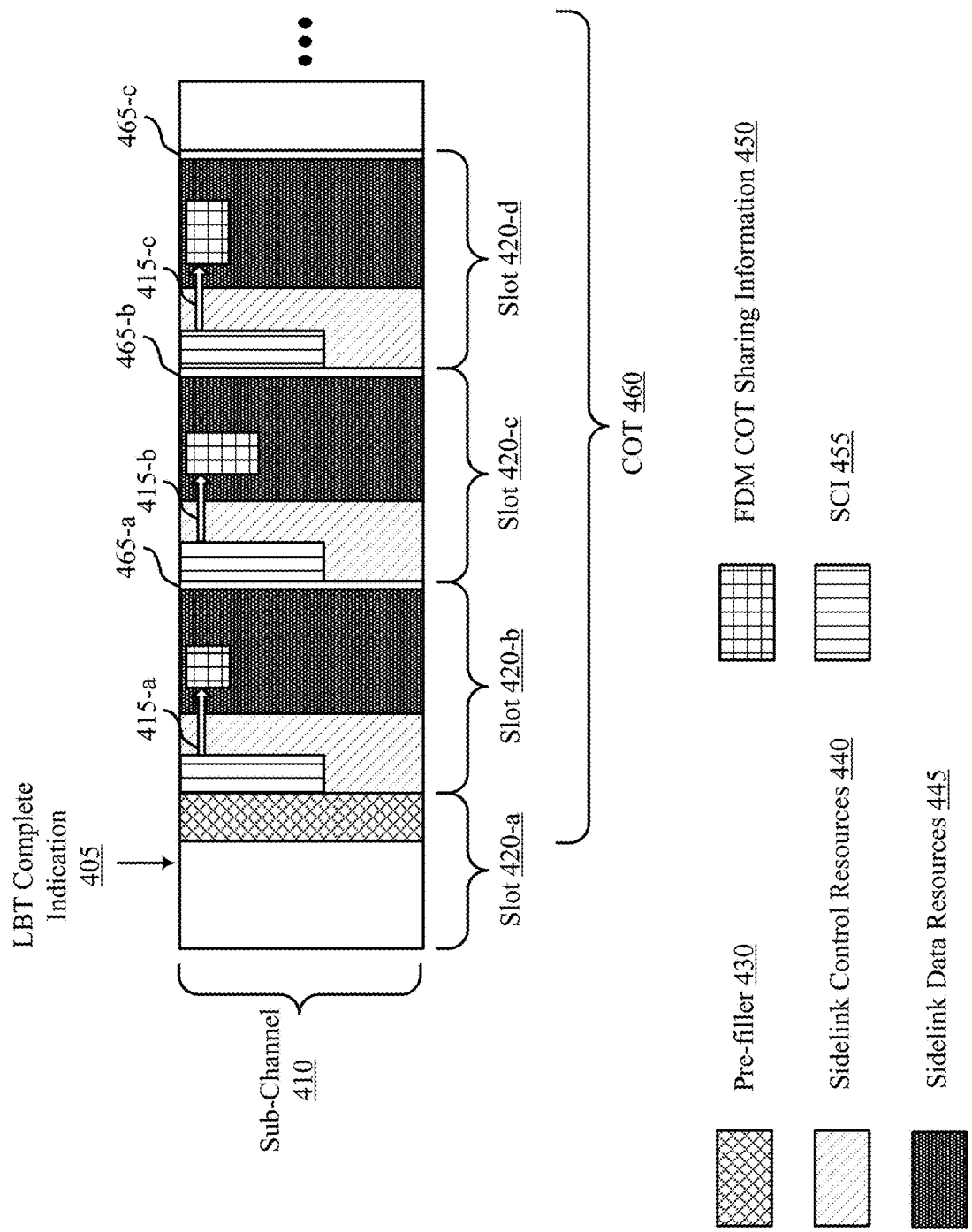

FIG. 4 illustrates an example of a sub-channel 410 that supports sub-channel-based occupancy time sharing for unlicensed sidelink in accordance with aspects of the present disclosure. In an aspect, the sub-channel 410 may support FDM-based COT sharing. The sub-channel 410 may be an interlaced (e.g., in frequency) sub-channel and may include one or more slots 420, as described with reference to FIG. 3. A slot 420 may include a number of symbols, such as OFDM or DFT-S-OFDM symbols, and the sub-channel may include a number of frequency resources (e.g., resource blocks). In some aspects, a UE 115—such as a UE 115 as described with reference to FIGS. 1 through 3—may perform an LBT procedure and may determine an LBT complete indication 405 in slot 420-a to gain access to a shared channel bandwidth including the sub-channel 410 for a COT 460. In some aspects, the sub-channel 410 may include one or more gaps 465 in signaling at each slot boundary between slots 420 (e.g., gaps 465-a, 465-b, and 465-c). One or more slots 420 in the COT 460 may include SCI 455 (e.g., SCI 1, SCI 2, or a combination thereof) in sidelink control resources 440. Each SCI 455 may include a pointer 415 linked to a location in sidelink data resources 445 in which FDM COT sharing information 450 is transmitted. In some cases, TDM COT sharing information may be transmitted in a similar manner to FDM COT sharing information 450 as illustrated in FIG. 4. Additionally or alternatively, FDM COT sharing information 450 may be transmitted in a similar manner to TDM COT sharing information as illustrated in FIG. 3.

The sub-channel 410 may be used for sidelink communications by a UE 115, as described with reference to FIGS. 1 and 2. A UE 115 configured as a COT sharing provider may provide FDM COT sharing information 450 to other UEs 115 via the sub-channel 410. In some aspects, FDM COT sharing information 450 may be transmitted via the sub-channel 410 in the form of control information (e.g., SCI 1, SCI 2, or any other sidelink control information). Additionally or alternatively, FDM COT sharing information 450 may be transmitted via sidelink data resources 445. In some aspects, a COT sharing provider may indicate a portion of available FDM resources of the COT 460 to other UEs 115 via FDM COT sharing information 450. The COT sharing provider may transmit other signals in a remainder of the available resources of the COT 460. The available FDM COT sharing information 450 may be indicated by a pointer 415 (e.g., pointers 415-a, 415-b, and 415-c). Pointers 415 may be linked from an SCI 455 (e.g., SCI 1) to a location (e.g., one or more resources) in the sidelink data resources 445 that includes the FDM COT sharing information 450 (e.g., in SCI 2).

In some cases, interference may occur in the sub-channel 410. Interference may be reduced by including one or more gaps 465 between slots 420 (e.g., 16 µs gaps). In one aspect, gap 465-a may reduce interference between slots 420-b and 420-c. Additionally or alternatively, a pre-filler 430 may be transmitted in one or more symbols and/or frequency resources of the sub-channel 410. The pre-filler 430 may include an occupancy signal and may be transmitted in one or more symbols following the LBT complete indication 405 and prior to sidelink control or sidelink data transmission. In some aspects, the pre-filler 430 may support chase combining with the FDM COT sharing information 450 for improved decoding of the FDM COT sharing information 450.

In some aspects, the FDM COT sharing information 450 may be transmitted at a fixed location in a slot 420 (e.g., back-loaded at a fixed location within a slot). FDM COT sharing information 450 may be located in symbols relatively near the end of a slot 420. Additionally or alternatively, FDM COT sharing information 450 may be transmitted using sidelink data resources 445 or may be multiplexed with sidelink data resources 445. Slots 420 may include an SCI 455 (e.g., SCI 1 and/or SCI 2). An SCI 455 may include a pointer 415 (e.g., pointer 415-c may be associated with the SCI 455 in slot 420-d). The SCI 455 and associated pointer 415 may point to FDM COT sharing information 450. In one aspect, slot 420-b may include pointer 415-a, which may point to control information (e.g., SCI 2) in the sidelink data resources 445 which may include FDM COT sharing information 450. Similarly, slot 420-c may include pointer 415-b and slot 420-d may include pointer 415-c.

A UE 115 configured as a COT sharing provider may provide FDM COT sharing information 450 to other UEs 115 via the sub-channel 410. UEs 115 may read an indication of the FDM COT sharing information 450 in a slot 420, and may be able to use the COT in that slot 420 or a subsequent slot 420. In one aspect, a UE 115 may read FDM COT sharing information 450 in slot 420-c, and may access the sub-channel 410 to transmit in available FDM resources of COT 460 in slot 420-d. The FDM COT sharing information 450 may specify a number of frequency resources, a number of sub-channels 410, or a combination thereof for FDM sharing. In some aspects, the COT sharing provider may share a first set of frequency resources with other UEs 115 in a slot 420 while maintaining a second set of frequency resources in the slot 420 for sidelink transmissions by the COT sharing provider. In this way, the COT sharing provider may transmit a sidelink data message in the COT 460 concurrent to one or more sidelink data transmissions by COT sharing receivers. Specifically, a COT sharing receiver UE 115 may receive an FDM COT sharing indicator in a slot, n, and may contend for a portion of the shared COT resources in a subsequent slot, n+1 (e.g., using Type 2B LBT, Type 2C LBT, or any other channel access procedure).

As described herein, a UE 115 may be configured as a COT sharing provider and may provide FDM COT sharing information 450 in a sub-channel 410 to share a portion of the available resources of the sub-channel 410 for the COT 460 with other UEs 115. The COT sharing provider may continue to use remaining portions of the sub-channel 410 for other sidelink transmissions while providing FDM sharing of COT resources.

Figure 5:
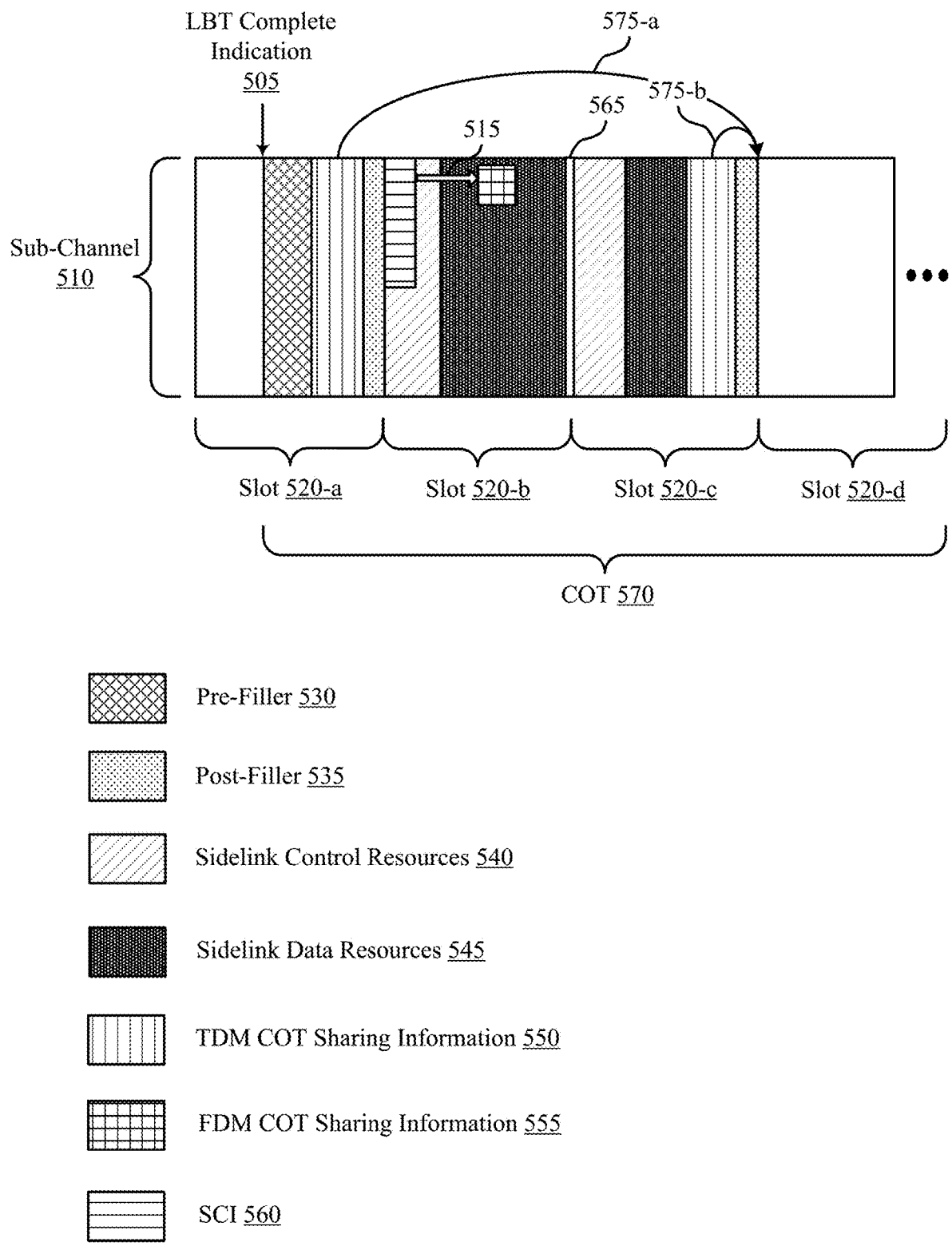

FIG. 5 illustrates an example of a sub-channel 510 that supports sub-channel-based occupancy time sharing for unlicensed sidelink in accordance with aspects of the present disclosure. In an aspect, the sub-channel 510 may support a combination of FDM sidelink COT sharing and TDM sidelink COT sharing. The sub-channel 510 may be an interlaced (e.g., in frequency) sub-channel and may include one or more slots 520. The slots 520 may include TDM COT sharing information 550, FDM COT sharing information 555, or both. In some aspect, slot 520-a may include TDM COT sharing information 550 and may be an example of a slot 320 with reference to FIG. 3. Slot 520-b may include FDM COT sharing information 555 located in sidelink data resources 545 and may be an example of a slot 420 with reference to FIG. 4. The sub-channel 510 may include one or more pre-fillers 530 and/or post-fillers 535, which may be examples of pre-fillers 330 and post-fillers 335 as described with reference to FIG. 3. Additionally or alternatively, the sub-channel 510 may include a number of signaling gaps 565 between slots 520. A UE 115 may perform an LBT procedure to gain access to the sub-channel 510 for a COT 570 upon determination of an LBT complete indication 505.

The sub-channel 510 may include one or more slots 520 with FDM COT sharing information 555 and/or one or more slots 520 with TDM COT sharing information 550. With reference to FIG. 5, the sub-channel 510 may include slots 520-*a* and 520-*c* with TDM COT sharing information 550 and may include slot 520-*b* with FDM COT sharing information 555 located in sidelink data resources 545. The TDM COT sharing information 550 in slots 520-*a* and 520-*c* may indicate available COT 570 resources via TDM COT sharing indicators 575-*a* and 575-*b*, respectively (e.g., indicating TDM COT sharing of resources starting in slot 520-*d*). In some aspects, a COT sharing provider may transmit a single instance of TDM COT sharing information 550 or may transmit multiple instances of the TDM COT sharing information 550 (e.g., as illustrated in FIG. 5 for improved redundancy, to support power savings, or both). One or more TDM COT sharing indicators 575 may provide early indications of available COT resources, which may provide options for reducing power used at one or more UEs 115. In one aspect, TDM COT sharing indicator 575-*a* may provide an indication of available resources of the COT 570 at a time earlier than TDM COT sharing indicator 575-*b*. A UE 115 attempting to access the COT 570 may read the earlier TDM COT sharing indicator 575-*a* and may determine to go into a power savings mode based on the indication (e.g., a UE 115 may detect TDM COT sharing indicator 575-*a* in slot 520-*a* and may enter a micro-sleep mode for power savings during slots 520-*b* and 520-*c* until the TDM COT sharing resources are available in indicated slot 520-*d*).

As described herein, a UE 115 configured as a COT sharing provider may provide one or more of TDM COT sharing information 550 and FDM COT sharing information 555 via the sub-channel 510. The TDM COT sharing information 550 and/or the FDM COT sharing information 555 may indicate a portion of resources (e.g., FDM resources, TDM resources, or a combination thereof) available in the COT 570 for sharing with other UEs 115. In some aspects, a COT sharing provider may transmit a combination of TDM COT sharing information 550 and FDM COT sharing information 555 to efficiently allocate available resources (e.g., frequency resources, time resources, or both) of the COT 570 for sidelink transmissions. In one aspect, a UE 115 may obtain the COT 570 and may share a portion of the available COT 570 in slot 520-*d* with other UEs 115 by using TDM COT sharing information 550. Additionally or alternatively, the UE 115 may use FDM COT sharing information 555 (e.g., indicated by a pointer 515 in SCI 560 transmitted in sidelink control resources 540) to indicate a portion of frequency resources available for sharing in slot 520-*c*. The UE 115 may use the remainder of frequency resources available in slot 520-*c* for sidelink data transmissions. Sharing COT information by sharing available FDM and TDM resources may improve utilization of the available resources in the COT 570.

Figure 6:
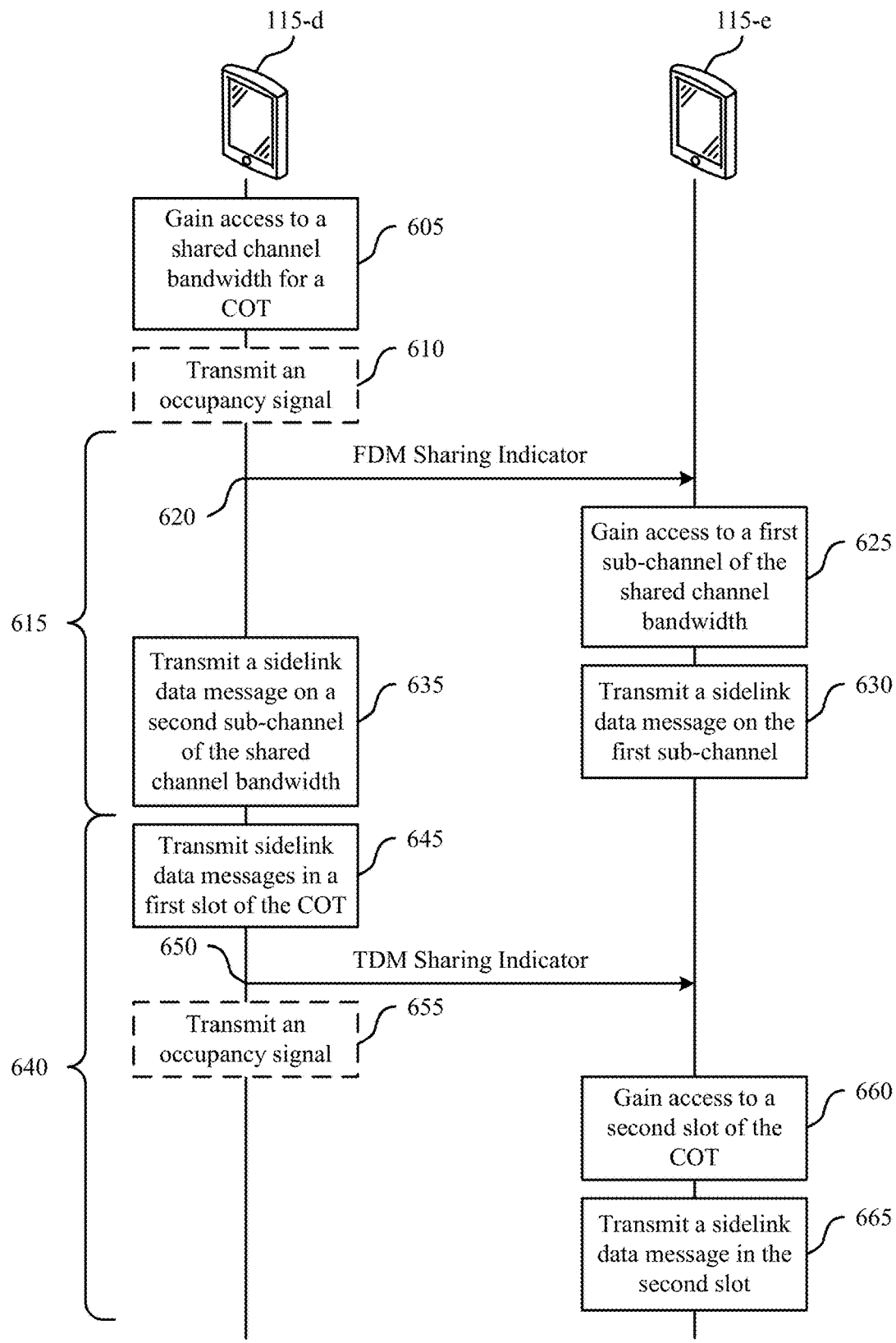
FIG. 6 illustrates an example of a process flow that supports sub-channel-based occupancy time sharing for unlicensed sidelink in accordance with aspects of the present disclosure.

FIG. 6 illustrates an example of a process flow 600 that supports sub-channel-based occupancy time sharing for unlicensed sidelink in accordance with aspects of the present disclosure. In some cases, the process flow 600 may implement aspects of a wireless communications system 100 or 200, as described with reference to FIGS. 1 and 2. In one aspect, UE 115-*d* and UE 115-*e*—which may be examples of the corresponding devices described with reference to FIGS. 1 and 2—may communicate over unlicensed sidelink channels. In some aspects, UE 115-*d* may act as a COT sharing provider UE and UE 115-*e* may act as a COT sharing receiver UE according to the processes described herein. Alternative aspects of the following may be implemented, where some steps are performed in a different order than described or are not performed at all. In some cases, steps may include additional features not mentioned below, or further steps may be added.

At 605, UE 115-*d* (e.g., a COT sharing provider UE 115) may gain access to a shared channel bandwidth for an occupancy time (e.g., a COT) based on a channel access procedure. In an aspect, UE 115-*d* may perform an LBT procedure (e.g., a Type 1 LBT procedure) and determine (e.g., receive) an LBT complete indication to gain access to the shared channel bandwidth. The shared channel bandwidth may include a set of sub-channels (e.g., interleaved sub-channels) for the COT.

In some cases, at 610, UE 115-*d* may transmit an occupancy signal based on gaining access to the shared channel bandwidth prior to a set of resources for transmitting a sharing indicator (e.g., a COT sharing indicator). In some cases, the occupancy signal may be an example of a pre-filler. In some aspects, the occupancy signal may include repeated COT sharing information to support chase combining.

At 615, UE 115-*d* may support FDM COT sharing. At 620, UE 115-*d* may identify a set of resources (e.g., a window) for transmission of a sharing indicator and may transmit, on a sub-channel of the shared channel bandwidth, a sidelink control message including the sharing indicator. In some aspects, the sharing indicator may indicate FDM sharing for a portion of the occupancy time (e.g., supporting FDM sharing of a first sub-channel of the shared channel bandwidth).

At 625, UE 115-*e* (e.g., a COT sharing receiver UE 115) may gain access to the first sub-channel of the shared channel bandwidth based on the FDM sharing indicator. In some cases, UE 115-*e* may determine the procedures for gaining access to the FDM shared resources, the FDM shared resources themselves, or both based on fields in the FDM sharing indicator or based on a window (e.g., a set of resources) in which the FDM sharing indicator is received. Gaining access to the FDM shared resources may involve an LBT procedure, such as a Type 2 LBT procedure, for a contention window managed by UE 115-*d*.

At 630, UE 115-*e* may transmit a sidelink data message on the first sub-channel of the shared channel bandwidth based on gaining access to the FDM shared resources. In some cases, at 635, UE 115-*d* may concurrently transmit a sidelink data message on a second sub-channel of the shared channel bandwidth (e.g., in frequency resources not shared by the FDM COT sharing).

At 640, UE 115-*d* may support TDM COT sharing. In some aspects, for a given COT, a COT sharing provider may implement no COT sharing, FDM COT sharing, TDM COT sharing, or a combination of FDM and TDM COT sharing.

At 645, UE 115-*d* may transmit sidelink data messages in a first slot of the COT (e.g., prior to TDM COT sharing). At 650, UE 115-*d* may identify a set of resources for transmission of a sharing indicator and may transmit, on a sub-channel of the shared channel bandwidth, a sidelink control message including the sharing indicator. In some aspects, the sharing indicator may indicate TDM sharing for a portion of the occupancy time (e.g., supporting TDM sharing of a second slot of the COT for the shared channel bandwidth). In some aspects, UE 115-d may transmit an occupancy signal (e.g., a post-filler) at 655 upon completion of transmitting the COT sharing indicator and prior to the second slot.

At 660, UE 115-e may gain access to the shared channel bandwidth for the second slot of the COT based on the TDM sharing indicator. In some cases, UE 115-e may determine the procedures for gaining access to the TDM shared resources, the TDM shared resources themselves, or both based on fields in the TDM sharing indicator or based on a window (e.g., a set of resources) in which the TDM sharing indicator is received. Gaining access to the TDM shared resources may involve an LBT procedure, such as a Type 2 LBT procedure, for a contention window managed by UE 115-d. At 665, UE 115-e may transmit a sidelink data message in the second slot of the COT. UE 115-d may refrain from transmitting in the second slot of the COT (e.g., based on sharing these resources with other UEs 115 using TDM techniques).

Figure 7:
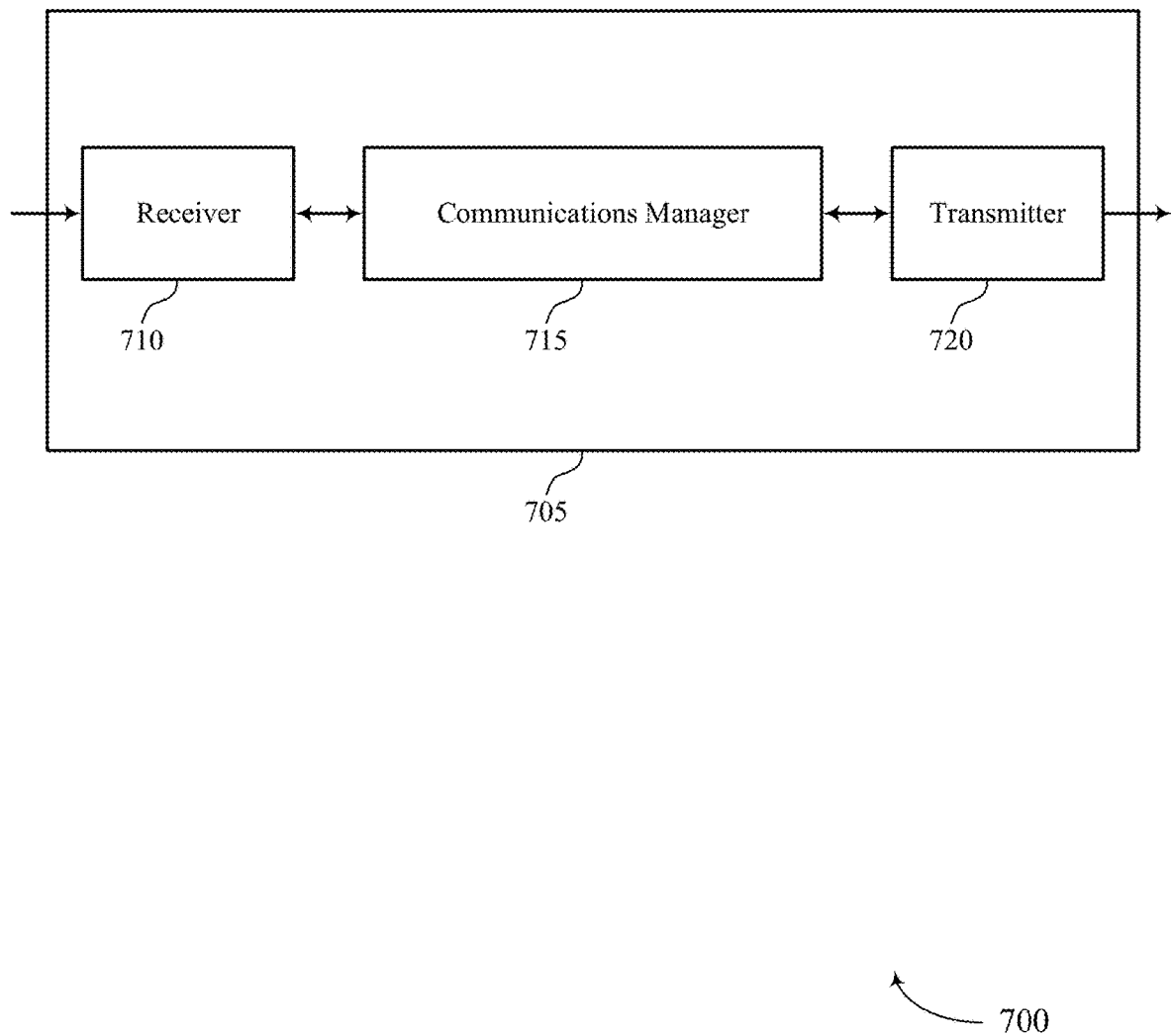
FIGS. 7 and 8 show block diagrams of devices that support sub-channel-based occupancy time sharing for unlicensed sidelink in accordance with aspects of the present disclosure.

FIG. 7 shows a block diagram 700 of a device 705 that supports sub-channel-based occupancy time sharing for unlicensed sidelink in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to sub-channel-based occupancy time sharing for unlicensed sidelink, etc.). Information may be passed on to other components of the device 705. The receiver 710 may be an example of aspects of the transceiver 1020 described with reference to FIG. 10. The receiver 710 may utilize a single antenna or a set of antennas.

In some implementations, the communications manager 715 may gain access to a shared channel bandwidth for an occupancy time based on a channel access procedure, identify a set of resources for transmission of a sharing indicator, transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof, and communicate during the occupancy time based on the sharing indicator. In some other implementations, the communications manager 715 may receive, from a UE on a sub-channel of a shared channel bandwidth, a sidelink control message including a sharing indicator in a set of resources, determine that the sharing indictor indicates TDM sharing for a portion of the occupancy time, FDM sharing for the portion of the occupancy time, or a combination thereof, gain access to the shared channel bandwidth for the portion of the occupancy time based on the sharing indicator and a channel access procedure for sharing the occupancy time, and transmit a sidelink data message in the portion of the occupancy time based on the gaining access to the shared channel bandwidth. The communications manager 715 may be an example of aspects of the communications manager 1010 described herein.

The actions performed by the communications manager 715 as described herein may be implemented to realize one or more potential advantages. In one aspect, sharing a portion of a shared channel bandwidth during an occupancy time may allow for an efficient usage of the unlicensed sidelink channel resources. Additionally or alternatively, the sharing techniques may provide robustness against other interference sources, such as Wi-Fi. In one aspect, if a UE is being starved of channel access by a neighboring node (e.g., a neighboring Wi-Fi node), another UE that successfully gains channel access may share the channel resources with the starved UE to improve channel access opportunities. Such a procedure may further reduce communication latency for the UE gaining access to the channel using the shared resources. Additionally or alternatively, the COT sharing procedure may effectively shelter sidelink communications suffering from hidden node interference. In some aspects, relatively low-complexity UEs (e.g., UEs not performing Type 1 LBT) may access a sidelink channel using the sharing indicator and a reduced LBT procedure.

Based on a provider UE sharing a portion of the occupancy time with a receiving UE, a processor of the device 705 (e.g., a processor controlling the receiver 710, the communications manager 715, the transmitter 720, etc.) may reduce processing resources used for sidelink communications. In one aspect, by mitigating hidden node interference, a device 705 (e.g., a UE 115) may reduce a number of retransmissions performed to successfully communicate a sidelink data message. Reducing the number of sidelink retransmissions may reduce a number of times the processor ramps up processing power and turns on processing units to handle sidelink communications. Additionally or alternatively, a device 705 may reduce a signaling latency for sidelink communications by gaining access to shared channel resources using a COT sharing indicator.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some aspects, the communications manager 715, or its sub-components, may be a separate and distinct component in accordance with various aspects of the present disclosure. In some aspects, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some aspects, the transmitter 720 may be collocated with a receiver 710 in a transceiver module. In one aspect, the transmitter 720 may be an example of aspects of the transceiver 1020 described with reference to FIG. 10. The transmitter 720 may utilize a single antenna or a set of antennas.

Figure 8:
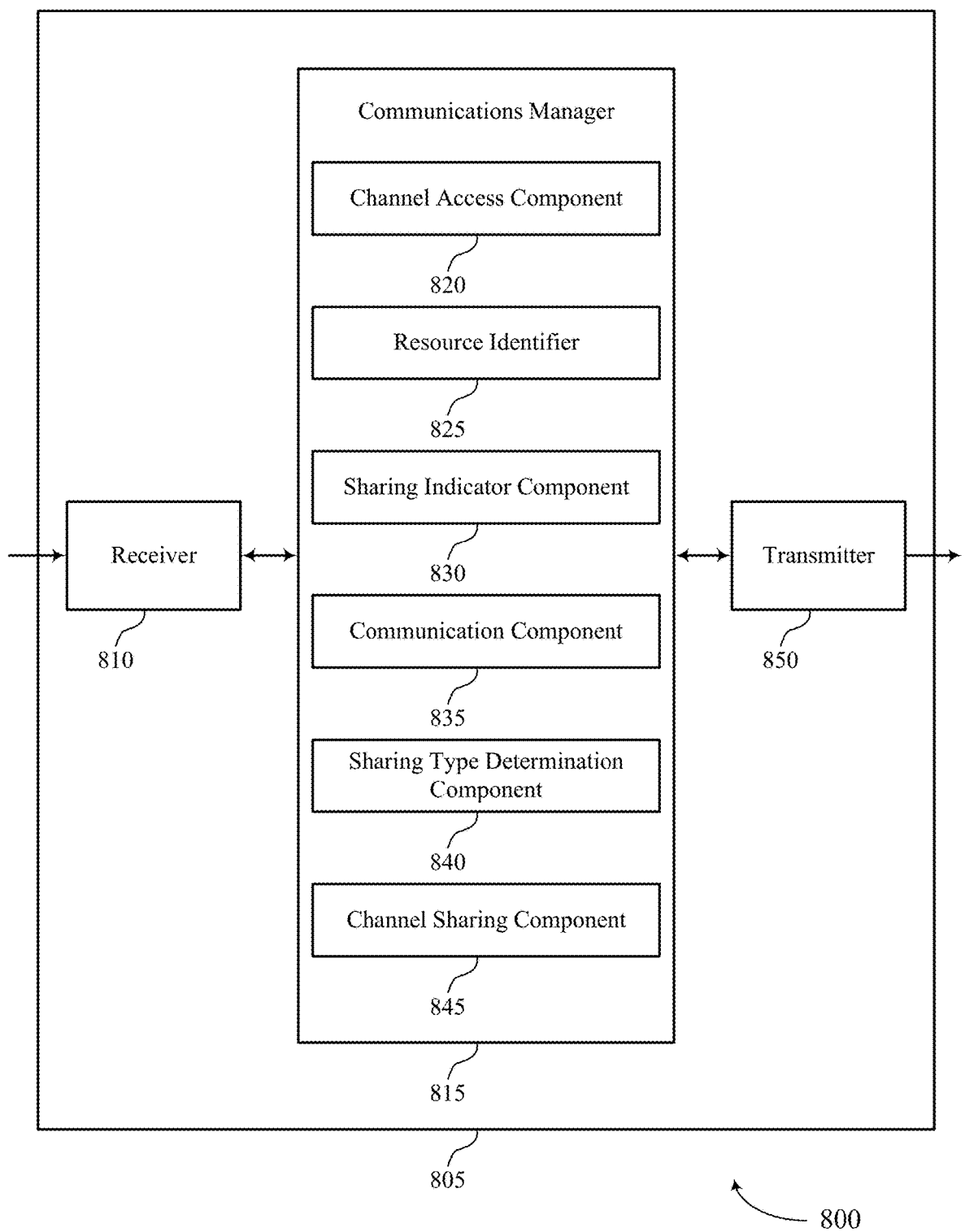

FIG. 8 shows a block diagram 800 of a device 805 that supports sub-channel-based occupancy time sharing for unlicensed sidelink in accordance with aspects of the present disclosure. The device 805 may be an example of aspects of a device 705 or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to sub-channel-based occupancy time sharing for unlicensed sidelink, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a channel access component 820, a resource identifier 825, a sharing indicator component 830, a communication component 835, a sharing type determination component 840, a channel sharing component 845, or any combination thereof. The communications manager 815 may be an example of aspects of the communications manager 1010 described herein.

In some implementations, the channel access component 820 may gain access to a shared channel bandwidth for an occupancy time based on a channel access procedure. The resource identifier 825 may identify a set of resources for transmission of a sharing indicator. The sharing indicator component 830 may transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof. The communication component 835 may communicate during the occupancy time based on the sharing indicator.

In some other implementations, the sharing indicator component 830 may receive, from a UE on a sub-channel of a shared channel bandwidth, a sidelink control message including a sharing indicator in a set of resources. The sharing type determination component 840 may determine that the sharing indictor indicates TDM sharing for a portion of the occupancy time, FDM sharing for the portion of the occupancy time, or a combination thereof. The channel access component 820 may gain access to the shared channel bandwidth for the portion of the occupancy time based on the sharing indicator and a channel access procedure for sharing the occupancy time. The channel sharing component 845 may transmit a sidelink data message in the portion of the occupancy time based on the gaining access to the shared channel bandwidth.

The transmitter 850 may transmit signals generated by other components of the device 805. In some aspects, the transmitter 850 may be collocated with a receiver 810 in a transceiver module. In one aspect, the transmitter 850 may be an example of aspects of the transceiver 1020 described with reference to FIG. 10. The transmitter 850 may utilize a single antenna or a set of antennas.

Figure 9:
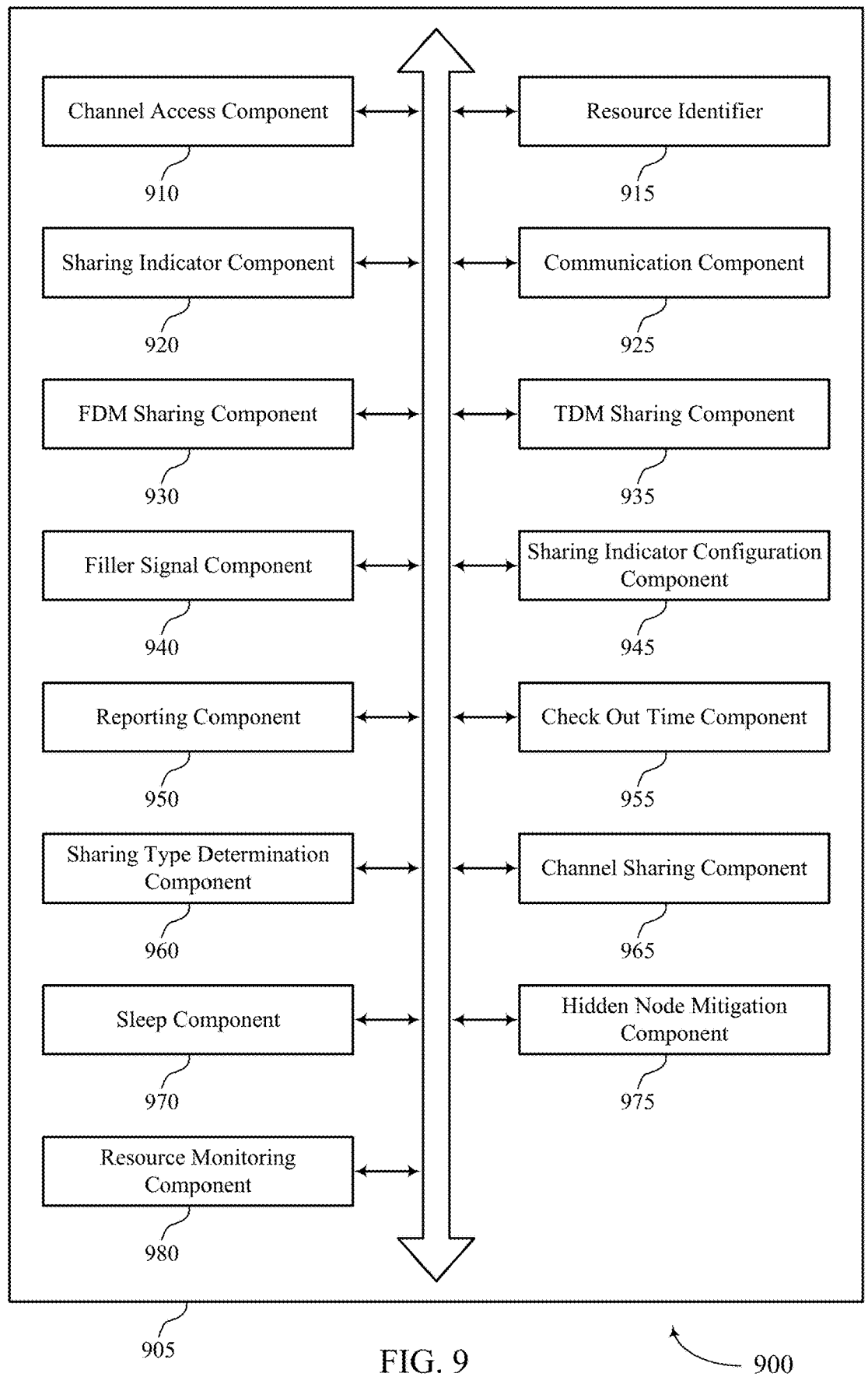
FIG. 9 shows a block diagram of a communications manager that supports sub-channel-based occupancy time sharing for unlicensed sidelink in accordance with aspects of the present disclosure.

FIG. 9 shows a block diagram 900 of a communications manager 905 that supports sub-channel-based occupancy time sharing for unlicensed sidelink in accordance with aspects of the present disclosure. The communications manager 905 may be an example of aspects of a communications manager 715, a communications manager 815, or a communications manager 1010 described herein. The communications manager 905 may include a channel access component 910, a resource identifier 915, a sharing indicator component 920, a communication component 925, an FDM sharing component 930, a TDM sharing component 935, a filler signal component 940, a sharing indicator configuration component 945, a reporting component 950, a check out time component 955, a sharing type determination component 960, a channel sharing component 965, a sleep component 970, a hidden node mitigation component 975, a resource monitoring component 980, or any combination thereof. Each of these components may communicate, directly or indirectly, with one another (e.g., via one or more buses).

In some implementations, the channel access component 910 may gain access to a shared channel bandwidth for an occupancy time based on a channel access procedure. The resource identifier 915 may identify a set of resources for transmission of a sharing indicator. The sharing indicator component 920 may transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof. The communication component 925 may communicate during the occupancy time based on the sharing indicator.

In some aspects, the sharing indicator indicates at least FDM sharing of a first sub-channel of the shared channel bandwidth. In some such aspects, communicating may include the FDM sharing component 930 transmitting a sidelink data message on a second sub-channel of the shared channel bandwidth concurrent to a sidelink transmission by a responding UE on the first sub-channel during the occupancy time.

In some aspects, the sharing indicator indicates at least TDM sharing of a second slot of the occupancy time. In some such aspects, communicating may include the TDM sharing component 935 transmitting a sidelink data message in a first slot of the occupancy time prior to the second slot of the occupancy time and refraining from transmitting during the second slot of the occupancy time.

In some aspects, the filler signal component 940 may transmit an occupancy signal upon completion of the transmitting the sidelink control message and prior to the second slot. Additionally or alternatively, the filler signal component 940 may transmit an occupancy signal based on the gaining access to the shared channel bandwidth and prior to the set of resources.

In some aspects, the sidelink control message including the sharing indicator is transmitted in a first slot of the occupancy time. In some aspects, the sharing indicator indicates a second slot of the occupancy time for sharing the portion of the occupancy time. In some aspects, the sidelink control message including the sharing indicator is transmitted in a second half of the first slot. In some aspects, the transmitting the sidelink control message including the sharing indicator is complete prior to a last symbol of the first slot.

In some aspects, the sharing indicator further indicates an LBT type for a responding UE to share the occupancy time, a CAPC, an ED threshold, a distance threshold, a set of interlaced frequency resources, a device identifier, location information, or a combination thereof.

The sharing indicator configuration component 945 may receive, from a base station, a sharing indicator configuration message indicating the set of resources for transmission of the sharing indicator, where the set of resources is identified and the sidelink control message is transmitted based on the sharing indicator configuration message. The reporting component 950 may transmit, to the base station, a report message confirming transmission of the sidelink control message including the sharing indicator in the set of resources.

In some aspects, the reporting component 950 may monitor a sidelink feedback channel for a collision in the portion of the occupancy time, the set of resources, or both. In some aspects, the reporting component 950 may transmit, to the base station, a report message based on the monitoring.

In some aspects, identifying the set of resources may include the resource identifier 915 selecting the set of resources from multiple sets of resources for transmission of the sharing indicator, where the sidelink control message including the sharing indicator is transmitted in the selected set of resources. In some aspects, the resource identifier 915 may identify the multiple sets of resources based on a SIB message, a dedicated RRC message, a DCI message, a pre-configuration, or a combination thereof. In some aspects, the set of resources indicates an LBT type for a responding UE to share the occupancy time, a CAPC, an ED threshold, or a combination thereof. In some aspects, the set of resources includes a set of time resources, a set of frequency resources, a set of beams, or a combination thereof.

The check out time component 955 may determine an earliest check out time for the occupancy time based on a CAPC, an ED threshold, or a combination thereof for the occupancy time, where the portion of the occupancy time is based on the earliest check out time for the occupancy time.

In some aspects, the channel access procedure may include an LBT procedure. In some such aspects, the channel access component 910 may perform the LBT procedure for the shared channel bandwidth, where the gaining access to the shared channel bandwidth for the occupancy time is based on a success of the LBT procedure. In some aspects, performing the LBT procedure may include the channel access component 910 monitoring an energy level of the shared channel bandwidth during a contention window that is asynchronous to a frame timing associated with the communicating, where the gaining access to the shared channel bandwidth for the occupancy time is based on the energy level being below an ED threshold for the contention window. In some aspects, the channel access component 910 may determine a duration of the contention window based on a SIB message, an RRC message, a DCI message, a pre-configuration, a channel busy ratio, sidelink feedback channel information, a collision rate, or a combination thereof.

In some aspects, the channel access procedure may include a grant-based procedure. In some such aspects, the channel access component 910 may receive, from a base station, a grant for the occupancy time of the shared channel bandwidth, where the gaining access to the shared channel bandwidth for the occupancy time is based on the grant.

In some aspects, the sidelink control message includes an SCI 1 message, an SCI 2 message, an occupancy time sharing sidelink control message, or a combination thereof.

In some other implementations, the sharing indicator component 920 may receive, from a UE on a sub-channel of a shared channel bandwidth, a sidelink control message including a sharing indicator in a set of resources. The sharing type determination component 960 may determine that the sharing indictor indicates TDM sharing for a portion of the occupancy time, FDM sharing for the portion of the occupancy time, or a combination thereof. The channel access component 910 may gain access to the shared channel bandwidth for the portion of the occupancy time based on the sharing indicator and a channel access procedure for sharing the occupancy time. The channel sharing component 965 may transmit a sidelink data message in the portion of the occupancy time based on the gaining access to the shared channel bandwidth.

In some aspects, the sharing indicator indicates at least FDM sharing of a first sub-channel of the shared channel bandwidth. In some such aspects, transmitting may include the FDM sharing component 930 transmitting the sidelink data message on the first sub-channel of the shared channel bandwidth concurrent to a sidelink transmission by the UE on a second sub-channel of the shared channel bandwidth during the occupancy time.

In some aspects, the sharing indicator indicates at least TDM sharing of a second slot of the occupancy time. In some such aspects, transmitting may include the TDM sharing component 935 refraining from transmitting during a first slot of the occupancy time prior to the second slot of the occupancy time and transmitting the sidelink data message in the second slot of the occupancy time.

In some aspects, the channel access procedure for sharing the occupancy time includes an LBT procedure. In some such aspects, the channel access component 910 may perform the LBT procedure for the shared channel bandwidth based on the portion of the occupancy time, where the gaining access to the shared channel bandwidth for the portion of the occupancy time is based on a success of the LBT procedure. In some aspects, the LBT procedure includes a first LBT procedure corresponding to a first monitoring duration that is shorter than a second monitoring duration for a second LBT procedure associated with contending for the occupancy time.

In some aspects, transmitting may include the channel sharing component 965 transmitting the sidelink data message during the portion of the occupancy time without performing a clear channel assessment (CCA) for the shared channel bandwidth.

In some aspects, the sidelink control message including the sharing indicator is received in a first slot of the occupancy time. In some aspects, the sharing indicator indicates a second slot of the occupancy time for sharing the portion of the occupancy time. In some aspects, the sidelink control message including the sharing indicator is received in a second half of the first slot. In some aspects, the receiving the sidelink control message including the sharing indicator is complete prior to a last symbol of the first slot.

In some aspects, the sleep component 970 may enter a sleep mode based on receiving the sharing indicator in the first slot of the occupancy time and may exit the sleep mode prior to the second slot of the occupancy time.

In some aspects, the sharing indicator component 920 may determine that the sharing indicator is a valid sharing indicator based on a distance threshold, a set of interlaced frequency resources, or a combination thereof for the sharing indicator.

In some aspects, the UE is a first UE. In some such aspects, the hidden node mitigation component 975 may receive, from a second UE, an indication that the first UE includes a proximate occupancy time sharing source for the second UE and determine to transmit the sidelink data message to the second UE in the portion of the occupancy time based on the indication that the first UE includes the proximate occupancy time sharing source for the second UE. In some aspects, the hidden node mitigation component 975 may determine a hidden node is interfering with one or more transmissions to the second UE, where the determining to transmit the sidelink data message to the second UE in the portion of the occupancy time is further based on the hidden node.

In some aspects, the sharing indicator further indicates an LBT type to share the occupancy time, a CAPC, an ED threshold, a device identifier for the UE, location information for the UE, or a combination thereof.

The resource monitoring component 980 may monitor multiple sets of resources for the sharing indicator, where the sidelink control message including the sharing indicator is received in the set of resources of the multiple sets of resources based on the monitoring. In some aspects, the resource monitoring component 980 may identify the multiple sets of resources based on a SIB message, a dedicated RRC message, a DCI message, a pre-configuration, or a combination thereof. In some aspects, the resource monitoring component 980 may determine an LBT type to share the occupancy time, a CAPC, an ED threshold, or a combination thereof based on the set of resources. In some aspects, the set of resources includes a set of time resources, a set of frequency resources, a set of beams, or a combination thereof.

In some aspects, the sidelink control message includes an SCI 1 message, an SCI 2 message, an occupancy time sharing sidelink control message, or a combination thereof.

Figure 10:
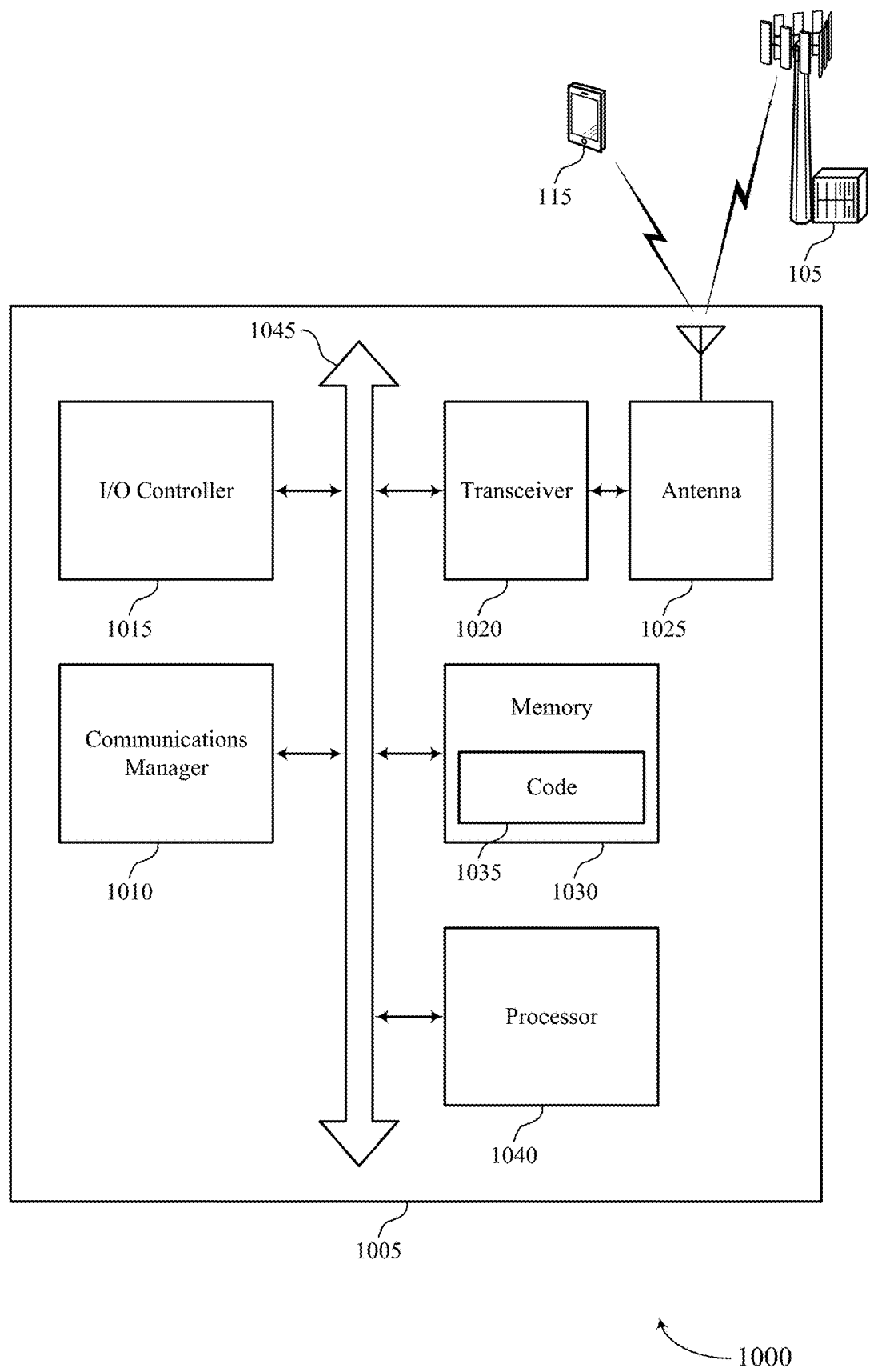
FIG. 10 shows a diagram of a system including a device that supports sub-channel-based occupancy time sharing for unlicensed sidelink in accordance with aspects of the present disclosure.

FIG. 10 shows a diagram of a system 1000 including a device 1005 that supports sub-channel-based occupancy time sharing for unlicensed sidelink in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

In some implementations, the communications manager 1010 may gain access to a shared channel bandwidth for an occupancy time based on a channel access procedure, identify a set of resources for transmission of a sharing indicator, transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof, and communicate during the occupancy time based on the sharing indicator. In some other implementations, the communications manager 1010 may receive, from a UE on a sub-channel of a shared channel bandwidth, a sidelink control message including a sharing indicator in a set of resources, determine that the sharing indictor indicates TDM sharing for a portion of the occupancy time, FDM sharing for the portion of the occupancy time, or a combination thereof, gain access to the shared channel bandwidth for the portion of the occupancy time based on the sharing indicator and a channel access procedure for sharing the occupancy time, and transmit a sidelink data message in the portion of the occupancy time based on the gaining access to the shared channel bandwidth.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. In one aspect, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sub-channel-based occupancy time sharing for unlicensed sidelink).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
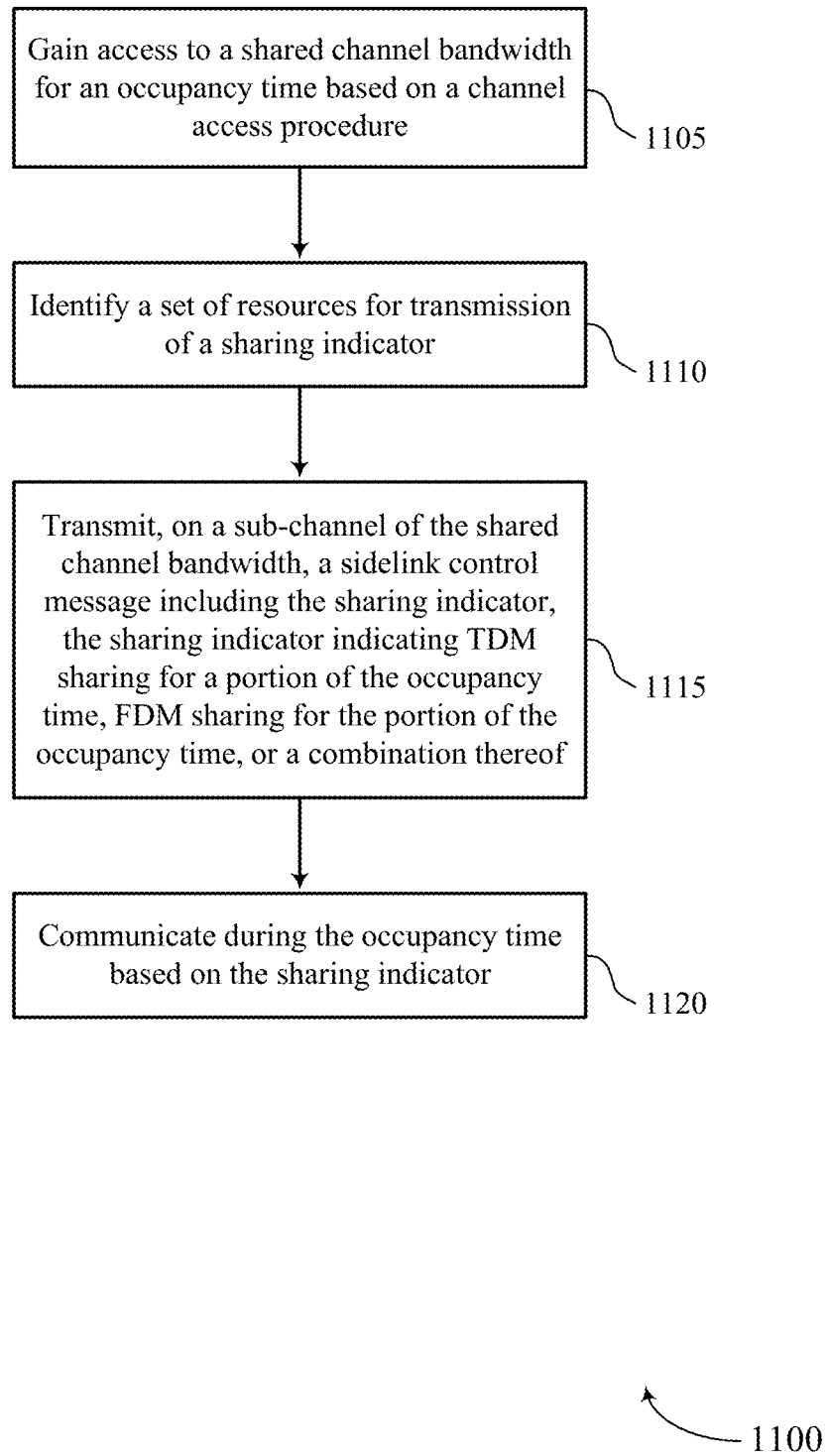
FIGS. 11 through 15 show flowcharts illustrating methods that support sub-channel-based occupancy time sharing for unlicensed sidelink in accordance with aspects of the present disclosure.

FIG. 11 shows a flowchart illustrating a method 1100 that supports sub-channel-based occupancy time sharing for unlicensed sidelink in accordance with aspects of the present disclosure. The operations of method 1100 may be implemented by a UE 115 or its components as described herein. In one aspect, the operations of method 1100 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1105, the UE may gain access to a shared channel bandwidth for an occupancy time based on a channel access procedure. The operations of 1105 may be performed according to the methods described herein. In some aspects, aspects of the operations of 1105 may be performed by a channel access component as described with reference to FIGS. 7 through 10.

At 1110, the UE may identify a set of resources for transmission of a sharing indicator. The operations of 1110 may be performed according to the methods described herein. In some aspects, aspects of the operations of 1110 may be performed by a resource identifier as described with reference to FIGS. 7 through 10.

At 1115, the UE may transmit, on a sub-channel of the shared channel bandwidth, a sidelink control message including the sharing indicator, the sharing indicator indicating TDM sharing for a portion of the occupancy time, FDM sharing for the portion of the occupancy time, or a combination thereof. The operations of 1115 may be performed according to the methods described herein. In some aspects, aspects of the operations of 1115 may be performed by a sharing indicator component as described with reference to FIGS. 7 through 10.

At 1120, the UE may communicate during the occupancy time based on the sharing indicator. The operations of 1120 may be performed according to the methods described herein. In some aspects, aspects of the operations of 1120 may be performed by a communication component as described with reference to FIGS. 7 through 10.

Figure 12:
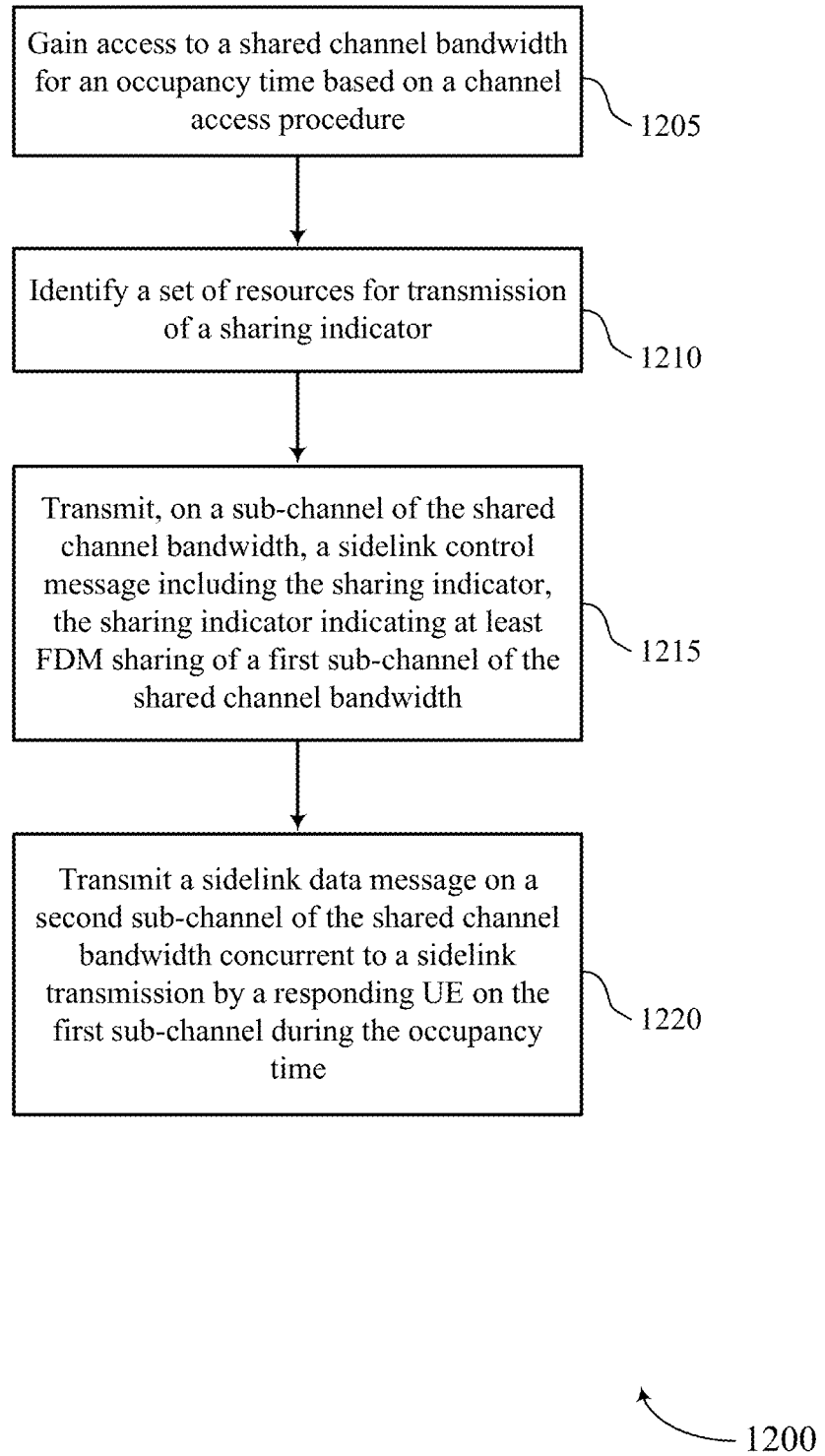

FIG. 12 shows a flowchart illustrating a method 1200 that supports sub-channel-based occupancy time sharing for unlicensed sidelink in accordance with aspects of the present disclosure. The operations of method 1200 may be implemented by a UE 115 or its components as described herein. In one aspect, the operations of method 1200 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1205, the UE may gain access to a shared channel bandwidth for an occupancy time based on a channel access procedure. The operations of 1205 may be performed according to the methods described herein. In some aspects, aspects of the operations of 1205 may be performed by a channel access component as described with reference to FIGS. 7 through 10.

At 1210, the UE may identify a set of resources for transmission of a sharing indicator. The operations of 1210 may be performed according to the methods described herein. In some aspects, aspects of the operations of 1210 may be performed by a resource identifier as described with reference to FIGS. 7 through 10.

At 1215, the UE may transmit, on a sub-channel of the shared channel bandwidth, a sidelink control message including the sharing indicator, the sharing indicator indicating at least FDM sharing of a first sub-channel of the shared channel bandwidth. The operations of 1215 may be performed according to the methods described herein. In some aspects, aspects of the operations of 1215 may be performed by a sharing indicator component as described with reference to FIGS. 7 through 10.

At 1220, the UE may transmit a sidelink data message on a second sub-channel of the shared channel bandwidth concurrent to a sidelink transmission by a responding UE on the first sub-channel during the occupancy time. The operations of 1220 may be performed according to the methods described herein. In some aspects, aspects of the operations of 1220 may be performed by an FDM sharing component as described with reference to FIGS. 7 through 10.

Figure 13:
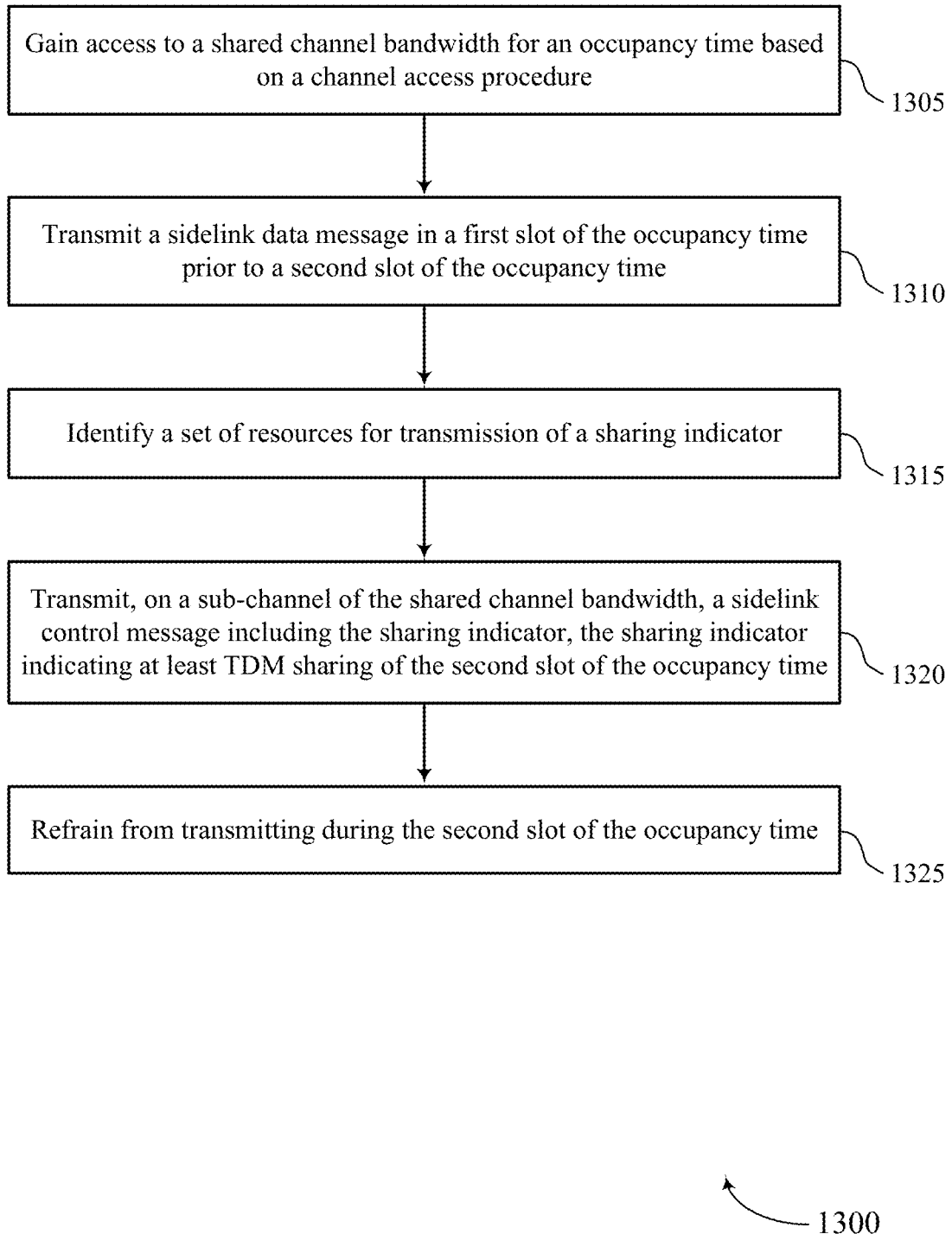

FIG. 13 shows a flowchart illustrating a method 1300 that supports sub-channel-based occupancy time sharing for unlicensed sidelink in accordance with aspects of the present disclosure. The operations of method 1300 may be implemented by a UE 115 or its components as described herein. In one aspect, the operations of method 1300 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1305, the UE may gain access to a shared channel bandwidth for an occupancy time based on a channel access procedure. The operations of 1305 may be performed according to the methods described herein. In some aspects, aspects of the operations of 1305 may be performed by a channel access component as described with reference to FIGS. 7 through 10.

At 1310, the UE may transmit a sidelink data message in a first slot of the occupancy time prior to a second slot of the occupancy time. The operations of 1310 may be performed according to the methods described herein. In some aspects, aspects of the operations of 1310 may be performed by a TDM sharing component as described with reference to FIGS. 7 through 10.

At 1315, the UE may identify a set of resources for transmission of a sharing indicator. The operations of 1315 may be performed according to the methods described herein. In some aspects, aspects of the operations of 1315 may be performed by a resource identifier as described with reference to FIGS. 7 through 10.

At 1320, the UE may transmit, on a sub-channel of the shared channel bandwidth, a sidelink control message including the sharing indicator, the sharing indicator indicating at least TDM sharing of the second slot of the occupancy time. The operations of 1320 may be performed according to the methods described herein. In some aspects, aspects of the operations of 1320 may be performed by a sharing indicator component as described with reference to FIGS. 7 through 10.

At 1325, the UE may refrain from transmitting during the second slot of the occupancy time (e.g., based on the TDM sharing). The operations of 1325 may be performed according to the methods described herein. In some aspects, aspects of the operations of 1325 may be performed by a TDM sharing component as described with reference to FIGS. 7 through 10.

Figure 14:
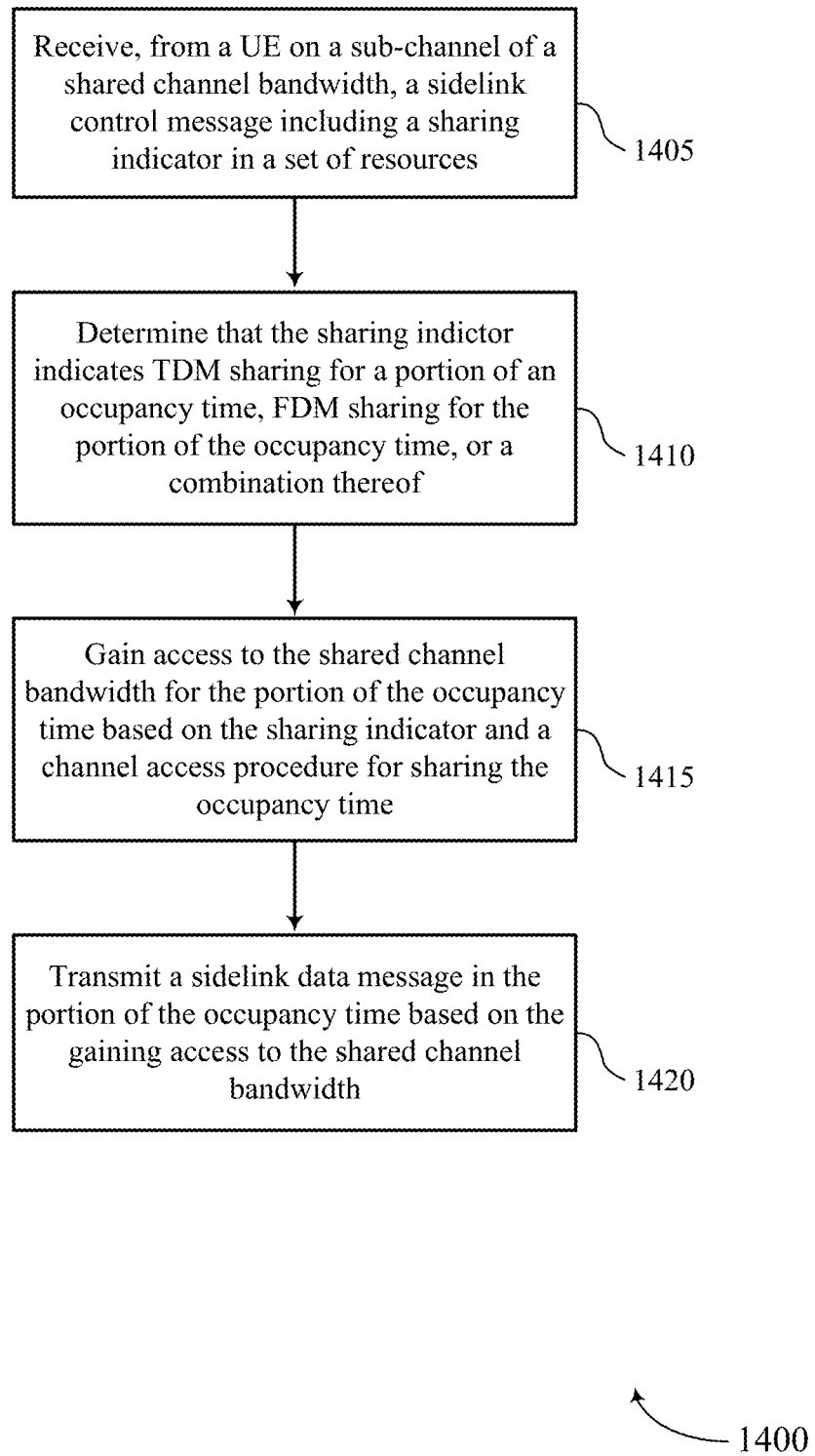

FIG. 14 shows a flowchart illustrating a method 1400 that supports sub-channel-based occupancy time sharing for unlicensed sidelink in accordance with aspects of the present disclosure. The operations of method 1400 may be implemented by a UE 115 or its components as described herein. In one aspect, the operations of method 1400 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1405, the UE may receive, from a UE on a sub-channel of a shared channel bandwidth, a sidelink control message including a sharing indicator in a set of resources. The operations of 1405 may be performed according to the methods described herein. In some aspects, aspects of the operations of 1405 may be performed by a sharing indicator component as described with reference to FIGS. 7 through 10.

At 1410, the UE may determine that the sharing indictor indicates TDM sharing for a portion of the occupancy time, FDM sharing for the portion of the occupancy time, or a combination thereof. The operations of 1410 may be performed according to the methods described herein. In some aspects, aspects of the operations of 1410 may be performed by a sharing type determination component as described with reference to FIGS. 7 through 10.

At 1415, the UE may gain access to the shared channel bandwidth for the portion of the occupancy time based on the sharing indicator and a channel access procedure for sharing the occupancy time. The operations of 1415 may be performed according to the methods described herein. In some aspects, aspects of the operations of 1415 may be performed by a channel access component as described with reference to FIGS. 7 through 10.

At 1420, the UE may transmit a sidelink data message in the portion of the occupancy time based on the gaining access to the shared channel bandwidth. The operations of 1420 may be performed according to the methods described herein. In some aspects, aspects of the operations of 1420 may be performed by a channel sharing component as described with reference to FIGS. 7 through 10.

Figure 15:
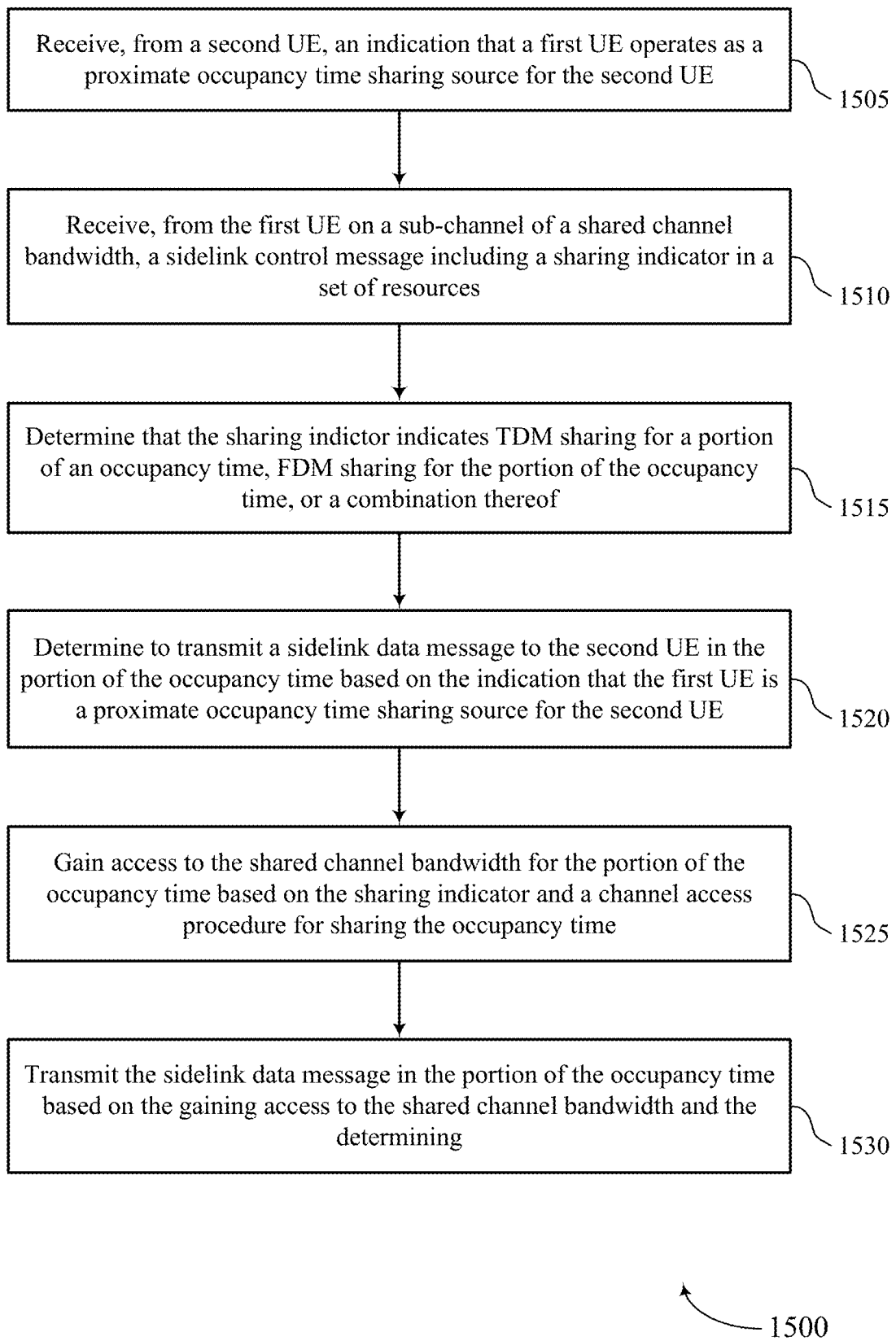

FIG. 15 shows a flowchart illustrating a method 1500 that supports sub-channel-based occupancy time sharing for unlicensed sidelink in accordance with aspects of the present disclosure. The operations of method 1500 may be implemented by a UE 115 or its components as described herein. In one aspect, the operations of method 1500 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1505, the UE (e.g., a third UE) may receive, from a second UE, an indication that a first UE operates as a proximate occupancy time sharing source for the second UE. The operations of 1505 may be performed according to the methods described herein. In some aspects, aspects of the operations of 1505 may be performed by a hidden node mitigation component as described with reference to FIGS. 7 through 10.

At 1510, the UE may receive, from the first UE on a sub-channel of a shared channel bandwidth, a sidelink control message including a sharing indicator in a set of resources. The operations of 1510 may be performed according to the methods described herein. In some aspects, aspects of the operations of 1510 may be performed by a sharing indicator component as described with reference to FIGS. 7 through 10.

At 1515, the UE may determine that the sharing indictor indicates TDM sharing for a portion of the occupancy time, FDM sharing for the portion of the occupancy time, or a combination thereof. The operations of 1515 may be performed according to the methods described herein. In some aspects, aspects of the operations of 1515 may be performed by a sharing type determination component as described with reference to FIGS. 7 through 10.

At 1520, the UE may determine to transmit a sidelink data message to the second UE in the portion of the occupancy time based on the indication that the first UE operates as the proximate occupancy time sharing source for the second UE. The operations of 1520 may be performed according to the methods described herein. In some aspects, aspects of the operations of 1520 may be performed by a hidden node mitigation component as described with reference to FIGS. 7 through 10.

At 1525, the UE may gain access to the shared channel bandwidth for the portion of the occupancy time based on the sharing indicator and a channel access procedure for sharing the occupancy time. The operations of 1525 may be performed according to the methods described herein. In some aspects, aspects of the operations of 1525 may be performed by a channel access component as described with reference to FIGS. 7 through 10.

At 1530, the UE may transmit the sidelink data message in the portion of the occupancy time based on the gaining access to the shared channel bandwidth. The operations of 1530 may be performed according to the methods described herein. In some aspects, aspects of the operations of 1530 may be performed by a channel sharing component as described with reference to FIGS. 7 through 10.

Summary of Aspects

The following provides an overview of aspects of the present disclosure:

Aspect 1: A method for wireless communications, comprising: gaining access to a shared channel bandwidth for an occupancy time based at least in part on a channel access procedure; identifying a set of resources for transmission of a sharing indicator; transmitting, on a sub-channel of the shared channel bandwidth, a sidelink control message comprising the sharing indicator, the sharing indicator indicating time-division multiplexing (TDM) sharing for a portion of the occupancy time, frequency-division multiplexing (FDM) sharing for the portion of the occupancy time, or a combination thereof; and communicating during the occupancy time based at least in part on the sharing indicator.

Aspect 2: The method of aspect 1, wherein the sharing indicator indicates at least FDM sharing of a first sub-channel of the shared channel bandwidth, the communicating comprising transmitting a sidelink data message on a second sub-channel of the shared channel bandwidth concurrent to a sidelink transmission by a responding UE on the first sub-channel during the occupancy time.

Aspect 3: The method of aspect 1, wherein the sharing indicator indicates at least TDM sharing of a second slot of the occupancy time, the communicating comprising transmitting a sidelink data message in a first slot of the occupancy time prior to the second slot of the occupancy time; and refraining from transmitting during the second slot of the occupancy time.

Aspect 4: The method of aspect 3, further comprising: transmitting an occupancy signal upon completion of the transmitting the sidelink control message and prior to the second slot.

Aspect 5: The method of any of aspects 1 through 4, further comprising: transmitting an occupancy signal based at least in part on the gaining access to the shared channel bandwidth and prior to the set of resources.

Aspect 6: The method of any of aspects 1 through 5, wherein: the sidelink control message comprising the sharing indicator is transmitted in a first slot of the occupancy time; and the sharing indicator indicates a second slot of the occupancy time for sharing the portion of the occupancy time.

Aspect 7: The method of aspect 6, wherein: the sidelink control message comprising the sharing indicator is transmitted in a second half of the first slot; and the transmitting the sidelink control message comprising the sharing indicator is complete prior to a last symbol of the first slot.

Aspect 8: The method of any of aspects 1 through 7, wherein the sharing indicator further indicates a listen-before-talk type for a responding UE to share the occupancy time, a channel access priority class, an energy detection threshold, a distance threshold, a set of interlaced frequency resources, a device identifier, location information, or a combination thereof.

Aspect 9: The method of any of aspects 1 through 8, further comprising: receiving, from a base station, a sharing indicator configuration message indicating the set of resources for transmission of the sharing indicator, wherein the set of resources is identified and the sidelink control message is transmitted based at least in part on the sharing indicator configuration message.

Aspect 10: The method of aspect 9, further comprising: transmitting, to the base station, a report message confirming transmission of the sidelink control message comprising the sharing indicator in the set of resources.

Aspect 11: The method of aspect 9, further comprising: monitoring a sidelink feedback channel for a collision in the portion of the occupancy time, the set of resources, or both; and transmitting, to the base station, a report message based at least in part on the monitoring.

Aspect 12: The method of any of aspects 1 through 11, wherein the identifying the set of resources comprises: selecting the set of resources from a plurality of sets of resources for transmission of the sharing indicator, wherein the sidelink control message comprising the sharing indicator is transmitted in the selected set of resources.

Aspect 13: The method of aspect 12, further comprising: identifying the plurality of sets of resources based at least in part on a system information block message, a dedicated radio resource control message, a downlink control information message, a pre-configuration, or a combination thereof.

Aspect 14: The method of any of aspects 1 through 13, wherein the set of resources indicates a listen-before-talk type for a responding UE to share the occupancy time, a channel access priority class, an energy detection threshold, or a combination thereof.

Aspect 15: The method of any of aspects 1 through 14, wherein the set of resources comprises a set of time resources, a set of frequency resources, a set of beams, or a combination thereof.

Aspect 16: The method of any of aspects 1 through 15, further comprising: determining an earliest check out time for the occupancy time based at least in part on a channel access priority class, an energy detection threshold, or a combination thereof for the occupancy time, wherein the portion of the occupancy time is based at least in part on the earliest check out time for the occupancy time.

Aspect 17: The method of any of aspects 1 through 16, wherein the channel access procedure comprises a listen-before-talk procedure, the method further comprising: performing the listen-before-talk procedure for the shared channel bandwidth, wherein the gaining access to the shared channel bandwidth for the occupancy time is based at least in part on a success of the listen-before-talk procedure.

Aspect 18: The method of aspect 17, wherein the performing the listen-before-talk procedure comprises: monitoring an energy level of the shared channel bandwidth during a contention window that is asynchronous to a frame timing associated with the communicating, wherein the gaining access to the shared channel bandwidth for the occupancy time is based at least in part on the energy level being below an energy detection threshold for the contention window.

Aspect 19: The method of aspect 18, further comprising: determining a duration of the contention window based at least in part on a system information block message, a radio resource control message, a downlink control information message, a pre-configuration, a channel busy ratio, sidelink feedback channel information, a collision rate, or a combination thereof.

Aspect 20: The method of any of aspects 1 through 16, wherein the channel access procedure comprises a grant-based procedure, the method further comprising: receiving, from a base station, a grant for the occupancy time of the shared channel bandwidth, wherein the gaining access to the shared channel bandwidth for the occupancy time is based at least in part on the grant.

Aspect 21: The method of any of aspects 1 through 20, wherein the sidelink control message comprises a first stage sidelink control information message, a second stage sidelink control information message, an occupancy time sharing sidelink control message, or a combination thereof.

Aspect 22: A method for wireless communications, comprising: receiving, from a UE on a sub-channel of a shared channel bandwidth, a sidelink control message comprising a sharing indicator in a set of resources; determining that the sharing indictor indicates TDM sharing for a portion of the occupancy time, FDM sharing for the portion of the occupancy time, or a combination thereof; gaining access to the shared channel bandwidth for the portion of the occupancy time based at least in part on the sharing indicator and a channel access procedure by the UE for sharing the occupancy time; and transmitting a sidelink data message in the portion of the occupancy time based at least in part on the gaining access to the shared channel bandwidth.

Aspect 23: The method of aspect 22, wherein the sharing indicator indicates at least FDM sharing of a first sub-channel of the shared channel bandwidth, the transmitting comprising transmitting the sidelink data message on the first sub-channel of the shared channel bandwidth concurrent to a sidelink transmission by the UE on a second sub-channel of the shared channel bandwidth during the occupancy time.

Aspect 24: The method of aspect 22, wherein the sharing indicator indicates at least TDM sharing of a second slot of the occupancy time, the transmitting comprising refraining from transmitting during a first slot of the occupancy time prior to the second slot of the occupancy time; and transmitting the sidelink data message in the second slot of the occupancy time.

Aspect 25: The method of any of aspects 22 through 24, wherein the channel access procedure for sharing the occupancy time comprises a listen-before-talk procedure, the method further comprising: performing the listen-beforetalk procedure for the shared channel bandwidth based at least in part on the portion of the occupancy time, wherein the gaining access to the shared channel bandwidth for the portion of the occupancy time is based at least in part on a success of the listen-before-talk procedure.

Aspect 26: The method of aspect 25, wherein the listen-before-talk procedure comprises a first listen-before-talk procedure corresponding to a first monitoring duration that is shorter than a second monitoring duration for a second listen-before-talk procedure associated with contending for the occupancy time.

Aspect 27: The method of any of aspects 22 through 26, wherein the transmitting comprises: transmitting the sidelink data message during the portion of the occupancy time without performing a clear channel assessment for the shared channel bandwidth.

Aspect 28: The method of any of aspects 22 through 27, wherein: the sidelink control message comprising the sharing indicator is received in a first slot of the occupancy time; and the sharing indicator indicates a second slot of the occupancy time for sharing the portion of the occupancy time.

Aspect 29: The method of aspect 28, further comprising: entering a sleep mode based at least in part on receiving the sharing indicator in the first slot of the occupancy time; and exiting the sleep mode prior to the second slot of the occupancy time.

Aspect 30: The method of any of aspects 28 through 29, wherein: the sidelink control message comprising the sharing indicator is received in a second half of the first slot; and the receiving the sidelink control message comprising the sharing indicator is complete prior to a last symbol of the first slot.

Aspect 31: The method of any of aspects 22 through 30, further comprising: determining that the sharing indicator is a valid sharing indicator based at least in part on a distance threshold, a set of interlaced frequency resources, or a combination thereof for the sharing indicator.

Aspect 32: The method of any of aspects 22 through 31, wherein the UE comprises a first UE, the method further comprising: receiving, from a second UE, an indication that the first UE comprises a proximate occupancy time sharing source for the second UE; and determining to transmit the sidelink data message to the second UE in the portion of the occupancy time based at least in part on the indication that the first UE comprises the proximate occupancy time sharing source for the second UE.

Aspect 33: The method of aspect 32, further comprising: determining a hidden node is interfering with one or more transmissions to the second UE, wherein the determining to transmit the sidelink data message to the second UE in the portion of the occupancy time is further based at least in part on the hidden node.

Aspect 34: The method of any of aspects 22 through 33, wherein the sharing indicator further indicates a listen-before-talk type to share the occupancy time, a channel access priority class, an energy detection threshold, a device identifier for the UE, location information for the UE, or a combination thereof.

Aspect 35: The method of any of aspects 22 through 34, further comprising: monitoring a plurality of sets of resources for the sharing indicator, wherein the sidelink control message comprising the sharing indicator is received in the set of resources of the plurality of sets of resources based at least in part on the monitoring.

Aspect 36: The method of aspect 35, further comprising: identifying the plurality of sets of resources based at least in part on a system information block message, a dedicated radio resource control message, a downlink control information message, a pre-configuration, or a combination thereof.

Aspect 37: The method of any of aspects 35 through 36, further comprising: determining a listen-before-talk type to share the occupancy time, a channel access priority class, an energy detection threshold, or a combination thereof based at least in part on the set of resources.

Aspect 38: The method of any of aspects 35 through 37, wherein the set of resources comprises a set of time resources, a set of frequency resources, a set of beams, or a combination thereof.

Aspect 39: The method of any of aspects 22 through 38, wherein the sidelink control message comprises a first stage sidelink control information message, a second stage sidelink control information message, an occupancy time sharing sidelink control message, or a combination thereof.

Aspect 40: An apparatus for wireless communications, comprising a processor; memory coupled with the processor; and instructions stored in the memory and executable by the processor to cause the apparatus to perform a method of any of aspects 1 through 21.

Aspect 41: An apparatus for wireless communications, comprising at least one means for performing a method of any of aspects 1 through 21.

Aspect 42: A non-transitory computer-readable medium storing code for wireless communications, the code comprising instructions executable by a processor to perform a method of any of aspects 1 through 21.

Aspect 43: An apparatus for wireless communications, comprising a processor; memory coupled with the processor; and instructions stored in the memory and executable by the processor to cause the apparatus to perform a method of any of aspects 22 through 39.

Aspect 44: An apparatus for wireless communications, comprising at least one means for performing a method of any of aspects 22 through 39.

Aspect 45: A non-transitory computer-readable medium storing code for wireless communications, the code comprising instructions executable by a processor to perform a method of any of aspects 22 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that a list of at least one of A, B, or C means A or B or C or AB or AC or BC or ABC (i.e., A and B and C). Also, as used herein, the phrase "based on" shall not be construed as a reference to a closed set of conditions. In one aspect, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein, but is to be accorded the broadest scope consistent with the principles and novel features disclosed herein.

What is claimed is:

1. A method for wireless communications, comprising:
    gaining access to a shared channel bandwidth for an occupancy time based at least in part on a channel access procedure, wherein the channel access procedure succeeds in a first slot of the occupancy time;
    identifying a second set of resources for transmission of a sharing indicator comprising sharing information for the occupancy time;
    transmitting, based at least in part on the gaining access to the shared channel bandwidth and on a sub-channel of the shared channel bandwidth, an occupancy signal via a first set of resources that are included in the first slot of the occupancy time and are prior to the second set of resources for transmission of the sharing indicator in time, wherein the first set of resources and the second set of resources are contiguous in the first slot, and wherein the occupancy signal comprises a repetition of at least a portion of the sharing information included in the sharing indicator;
    transmitting, on the sub-channel of the shared channel bandwidth and via the second set of resources after the first set of resources, a sidelink control message comprising the sharing indicator, the sharing information included in the sharing indicator indicating time-division multiplexing (TDM) sharing for a portion of the occupancy time, frequency-division multiplexing (FDM) sharing for the portion of the occupancy time, or a combination thereof; and
    communicating during the occupancy time based at least in part on the sharing indicator.

2. The method of claim 1, wherein the sharing indicator indicates at least FDM sharing of a first sub-channel of the shared channel bandwidth, the communicating comprising:
- transmitting a sidelink data message on a second sub-channel of the shared channel bandwidth concurrent to a sidelink transmission by a responding user equipment (UE) on the first sub-channel during the occupancy time.

3. The method of claim 1, wherein the sharing indicator indicates at least TDM sharing of a second slot of the occupancy time, the communicating comprising:
- transmitting a sidelink data message in the first slot of the occupancy time prior to the second slot of the occupancy time; and
- refraining from transmitting during the second slot of the occupancy time.

4. The method of claim 3, further comprising:
- transmitting a second occupancy signal upon completion of the transmitting the sidelink control message and prior to the second slot.

5. The method of claim 1, wherein:
- the sharing indicator indicates a second slot of the occupancy time for sharing the portion of the occupancy time.

6. The method of claim 1, wherein the sharing indicator further indicates a listen-before-talk type for a responding user equipment (UE) to share the occupancy time, a channel access priority class, an energy detection threshold, a distance threshold, a set of interlaced frequency resources, a device identifier, location information, or a combination thereof.

7. The method of claim 1, further comprising:
- receiving a sharing indicator configuration message indicating the second set of resources for transmission of the sharing indicator, wherein the second set of resources is identified and the sidelink control message is transmitted based at least in part on the sharing indicator configuration message; and
- transmitting a report message confirming transmission of the sidelink control message comprising the sharing indicator in the second set of resources.

8. The method of claim 1, further comprising:
- receiving a sharing indicator configuration message indicating the second set of resources for transmission of the sharing indicator, wherein the second set of resources is identified and the sidelink control message is transmitted based at least in part on the sharing indicator configuration message;
- monitoring a sidelink feedback channel for a collision in the portion of the occupancy time, the second set of resources, or both; and
- transmitting a report message based at least in part on the monitoring.

9. The method of claim 1, further comprising:
- determining an earliest check out time for the occupancy time based at least in part on a channel access priority class, an energy detection threshold, or a combination thereof for the occupancy time, wherein the portion of the occupancy time is based at least in part on the earliest check out time for the occupancy time.

10. The method of claim 1, wherein the channel access procedure comprises a listen-before-talk procedure, the method further comprising:
- performing the listen-before-talk procedure for the shared channel bandwidth, wherein the gaining access to the shared channel bandwidth for the occupancy time is based at least in part on a success of the listen-before-talk procedure, and wherein the performing the listen-before-talk procedure comprises:
  - monitoring an energy level of the shared channel bandwidth during a contention window that is asynchronous to a frame timing associated with the communicating, wherein the gaining access to the shared channel bandwidth for the occupancy time is based at least in part on the energy level being below an energy detection threshold for the contention window.

11. A method for wireless communications, comprising:
- receiving, from a user equipment (UE) on a sub-channel of a shared channel bandwidth, an occupancy signal via a first set of resources;
- receiving, from the UE on the sub-channel of the shared channel bandwidth, a sidelink control message comprising a sharing indicator in a second set of resources that are subsequent to the first set of resources in time, wherein the first set of resources and the second set of resources are contiguous in a first slot of an occupancy time, wherein the sharing indicator comprises sharing information for the occupancy time, and wherein the occupancy signal comprises a repetition of at least a portion of the sharing information included in the sharing indicator;
- determining that the sharing information included in the sharing indicator indicates time-division multiplexing (TDM) sharing for a portion of the occupancy time, frequency-division multiplexing (FDM) sharing for the portion of the occupancy time, or a combination thereof;
- gaining access to the shared channel bandwidth for the portion of the occupancy time based at least in part on the sharing indicator and a channel access procedure by the UE for sharing the occupancy time, wherein the channel access procedure succeeds in the first slot of the occupancy time; and
- transmitting a sidelink data message in the portion of the occupancy time based at least in part on the gaining access to the shared channel bandwidth.

12. The method of claim 11, wherein the sharing indicator indicates at least FDM sharing of a first sub-channel of the shared channel bandwidth, the transmitting comprising:
- transmitting the sidelink data message on the first sub-channel of the shared channel bandwidth concurrent to a sidelink transmission by the UE on a second sub-channel of the shared channel bandwidth during the occupancy time.

13. The method of claim 11, wherein the sharing indicator indicates at least TDM sharing of a second slot of the occupancy time, the transmitting comprising:
- refraining from transmitting during the first slot of the occupancy time prior to the second slot of the occupancy time; and
- transmitting the sidelink data message in the second slot of the occupancy time.

14. The method of claim 11, wherein the channel access procedure for sharing the occupancy time comprises a listen-before-talk procedure, the method further comprising:
- performing the listen-before-talk procedure for the shared channel bandwidth based at least in part on the portion of the occupancy time, wherein the gaining access to the shared channel bandwidth for the portion of the occupancy time is based at least in part on a success of the listen-before-talk procedure, and wherein the listen-before-talk procedure comprises a first listen-before-talk procedure corresponding to a first monitoring duration that is shorter than a second monitoring duration for a second listen-before-talk procedure associated with contending for the occupancy time.

15. An apparatus for wireless communications, comprising:
a processor; and
memory coupled with the processor, wherein the memory comprises instructions executable by the processor to cause the apparatus to:
gain access to a shared channel bandwidth for an occupancy time based at least in part on a channel access procedure, wherein the channel access procedure succeeds in a first slot of the occupancy time;
identify a second set of resources for transmission of a sharing indicator comprising sharing information for the occupancy time;
transmit, based at least in part on the gaining access to the shared channel bandwidth and on a sub-channel of the shared channel bandwidth, an occupancy signal via a first set of resources that are included in the first slot of the occupancy time and are prior to the second set of resources for transmission of the sharing indicator in time, wherein the first set of resources and the second set of resources are contiguous in the first slot, and wherein the occupancy signal comprises a repetition of at least a portion of the sharing information included in the sharing indicator;
transmit, on the sub-channel of the shared channel bandwidth and via the second set of resources after the first set of resources, a sidelink control message comprising the sharing indicator, the sharing information included in the sharing indicator indicating time-division multiplexing (TDM) sharing for a portion of the occupancy time, frequency-division multiplexing (FDM) sharing for the portion of the occupancy time, or a combination thereof; and
communicate during the occupancy time based at least in part on the sharing indicator.

16. The apparatus of claim 15, wherein the sharing indicator indicates at least FDM sharing of a first sub-channel of the shared channel bandwidth, the instructions to communicate further executable by the processor to cause the apparatus to:
transmit a sidelink data message on a second sub-channel of the shared channel bandwidth concurrent to a sidelink transmission by a responding user equipment (UE) on the first sub-channel during the occupancy time.

17. The apparatus of claim 15, wherein the sharing indicator indicates at least TDM sharing of a second slot of the occupancy time, the instructions to communicate further executable by the processor to cause the apparatus to:
transmit a sidelink data message in the first slot of the occupancy time prior to the second slot of the occupancy time; and
refrain from transmitting during the second slot of the occupancy time.

18. The apparatus of claim 17, wherein the instructions are further executable by the processor to cause the apparatus to:
transmit a first occupancy signal based at least in part on the gaining access to the shared channel bandwidth and prior to the second set of resources; and
transmit a second occupancy signal upon completion of the transmitting the sidelink control message and prior to the second slot.

19. The apparatus of claim 15, wherein:
the sharing indicator indicates a second slot of the occupancy time for sharing the portion of the occupancy time.

20. The apparatus of claim 19, wherein:
the sidelink control message comprising the sharing indicator is transmitted in a second half of the first slot; and
the transmitting the sidelink control message comprising the sharing indicator is complete prior to a last symbol of the first slot.

21. The apparatus of claim 15, wherein the sharing indicator further indicates a listen-before-talk type for a responding user equipment (UE) to share the occupancy time, a channel access priority class, an energy detection threshold, a distance threshold, a set of interlaced frequency resources, a device identifier, location information, or a combination thereof.

22. The apparatus of claim 15, wherein the instructions are further executable by the processor to cause the apparatus to:
receive a sharing indicator configuration message indicating the second set of resources for transmission of the sharing indicator, wherein the second set of resources is identified and the sidelink control message is transmitted based at least in part on the sharing indicator configuration message; and
transmit a report message confirming transmission of the sidelink control message comprising the sharing indicator in the second set of resources.

23. The apparatus of claim 15, wherein the instructions are further executable by the processor to cause the apparatus to:
receive a sharing indicator configuration message indicating the second set of resources for transmission of the sharing indicator, wherein the second set of resources is identified and the sidelink control message is transmitted based at least in part on the sharing indicator configuration message;
monitor a sidelink feedback channel for a collision in the portion of the occupancy time, the second set of resources, or both; and
transmit a report message based at least in part on the monitoring.

24. The apparatus of claim 15, wherein the instructions are further executable by the processor to cause the apparatus to:
identify a plurality of sets of resources for transmission of the sharing indicator based at least in part on a system information block message, a dedicated radio resource control message, a downlink control information message, a pre-configuration, or a combination thereof; and
select the second set of resources from the plurality of sets of resources, wherein the sidelink control message comprising the sharing indicator is transmitted in the selected second set of resources.

25. The apparatus of claim 15, wherein the second set of resources indicates a listen-before-talk type for a responding user equipment (UE) to share the occupancy time, a channel access priority class, an energy detection threshold, or a combination thereof.

26. An apparatus for wireless communications, comprising:
a processor; and
memory coupled with the processor, wherein the memory comprises instructions executable by the processor to cause the apparatus to:

receive, from a user equipment (UE) on a sub-channel of a shared channel bandwidth, an occupancy signal via a first set of resources;

receive, from the UE on the sub-channel of the shared channel bandwidth, a sidelink control message comprising a sharing indicator in a second set of resources that are subsequent to the first set of resources in time, wherein the first set of resources and the second set of resources are contiguous in a first slot of an occupancy time, wherein the sharing indicator comprises sharing information for the occupancy time, and wherein the occupancy signal comprises a repetition of at least a portion of the sharing information included in the sharing indicator;

determine that the sharing information included in the sharing indicator indicates time-division multiplexing (TDM) sharing for a portion of the occupancy time, frequency-division multiplexing (FDM) sharing for the portion of the occupancy time, or a combination thereof;

gain access to the shared channel bandwidth for the portion of the occupancy time based at least in part on the sharing indicator and a channel access procedure for sharing the occupancy time, wherein the channel access procedure succeeds in the first slot of the occupancy time; and transmit a sidelink data message in the portion of the occupancy time based at least in part on the gaining access to the shared channel bandwidth.

27. The apparatus of claim 26, wherein the sharing indicator indicates at least FDM sharing of a first sub-channel of the shared channel bandwidth, the instructions to transmit further executable by the processor to cause the apparatus to:

transmit the sidelink data message on the first sub-channel of the shared channel bandwidth concurrent to a sidelink transmission by the UE on a second sub-channel of the shared channel bandwidth during the occupancy time.

28. The apparatus of claim 26, wherein the sharing indicator indicates at least TDM sharing of a second slot of the occupancy time, the instructions to transmit further executable by the processor to cause the apparatus to:

refrain from transmitting during the first slot of the occupancy time prior to the second slot of the occupancy time; and transmit the sidelink data message in the second slot of the occupancy time.

29. The apparatus of claim 26, wherein the channel access procedure for sharing the occupancy time comprises a listen-before-talk procedure, and the instructions are further executable by the processor to cause the apparatus to:

perform the listen-before-talk procedure for the shared channel bandwidth based at least in part on the portion of the occupancy time, wherein the gaining access to the shared channel bandwidth for the portion of the occupancy time is based at least in part on a success of the listen-before-talk procedure, wherein the listen-before-talk procedure comprises a first listen-before-talk procedure corresponding to a first monitoring duration that is shorter than a second monitoring duration for a second listen-before-talk procedure associated with contending for the occupancy time.

30. The apparatus of claim 26, wherein the instructions are further executable by the processor to cause the apparatus to:

enter a sleep mode based at least in part on receiving the sidelink control message comprising the sharing indicator in the first slot of the occupancy time, wherein the sharing indicator indicates a second slot of the occupancy time for sharing the portion of the occupancy time; and exit the sleep mode prior to the second slot of the occupancy time.

* * * * *